(12) United States Patent
Ishijima et al.

(10) Patent No.: US 7,959,229 B2
(45) Date of Patent: Jun. 14, 2011

(54) ADJUSTABLE SEAT INCLUDING OPERATING MEMBERS

(75) Inventors: Takahiro Ishijima, Aichi (JP); Katsuya Ueda, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 12/161,856

(22) PCT Filed: Jan. 25, 2007

(86) PCT No.: PCT/JP2007/051180
§ 371 (c)(1),
(2), (4) Date: Jul. 23, 2008

(87) PCT Pub. No.: WO2007/086465
PCT Pub. Date: Aug. 2, 2007

(65) Prior Publication Data
US 2009/0026791 A1    Jan. 29, 2009

(30) Foreign Application Priority Data

Jan. 27, 2006   (JP) ................................ 2006-019194

(51) Int. Cl.
*B60N 2/12* (2006.01)
*B60N 2/16* (2006.01)
*B60N 2/18* (2006.01)
*B60N 2/20* (2006.01)
(52) U.S. Cl. ..... 297/358; 297/337; 297/338; 297/344.1; 297/344.11; 297/344.12; 297/344.13; 297/344.14; 297/344.15; 297/361.1; 297/463.1
(58) Field of Classification Search .................. 297/337, 297/338, 358, 361.1, 344.1, 344.12, 344.13, 297/344.14, 354.1, 354.12, 463.1, 463.2, 344.11, 344.15
See application file for complete search history.

(56) References Cited

U.S. PATENT DOCUMENTS 3,953,069 A * 4/1976 Tamura et al. ............ 297/367 R
(Continued)

FOREIGN PATENT DOCUMENTS
DE           3319397          11/1984
(Continued)

OTHER PUBLICATIONS

T. Ishijima et al., "Seat," U.S. Appl. No. 12/159,808, filed Jul. 1, 2008.

(Continued)

*Primary Examiner* — Rodney B White
(74) *Attorney, Agent, or Firm* — Finnegan, Henderson, Farabow, Garrett & Dunner, LLP

(57) ABSTRACT

A seat may be obtained with good operability of plural operating members for operating plural adjustable units. A vehicle seat is provided with: a seat lifter, provided to a seat body for sitting on and adjustable by operation force transmitted from a first operating system; a reclining mechanism, provided to the seat body and adjustable by operation force transmitted from a second operating system; and an operation force imparting unit that is provided at a position where it is able to be operated by a seat occupant at a predetermined position on the seat body. The operation force imparting unit is able to independently take up a first state in which a lifter knob is operated and the seat lifter adjusted, and a second state in which the reclining lever is operated and the reclining mechanism adjusted.

23 Claims, 18 Drawing Sheets

U.S. PATENT DOCUMENTS

| | | | | |
|---|---|---|---|---|
| 3,957,312 | A * | 5/1976 | Bonnaud | 297/341 |
| 3,958,828 | A * | 5/1976 | Ishida et al. | 297/361.1 |
| 4,146,267 | A * | 3/1979 | Mori et al. | 297/367 R |
| 4,437,703 | A * | 3/1984 | Nishikori et al. | 297/362 |
| 4,461,511 | A | 7/1984 | Berneking et al. | |
| 4,466,661 | A * | 8/1984 | Narita | 297/367 R |
| 4,580,838 | A | 4/1986 | Schöttker et al. | |
| 4,653,807 | A | 3/1987 | Hirose et al. | |
| 4,700,989 | A | 10/1987 | Ercilla | |
| 4,995,669 | A * | 2/1991 | Croft | 297/378.12 |
| 5,393,116 | A * | 2/1995 | Bolsworth et al. | 296/65.03 |
| 5,597,205 | A | 1/1997 | Glance et al. | |
| 5,597,206 | A | 1/1997 | Ainsworth et al. | |
| 5,611,599 | A | 3/1997 | Baloche et al. | |
| 5,700,055 | A | 12/1997 | Davidson et al. | |
| 5,788,330 | A * | 8/1998 | Ryan | 297/378.12 |
| 5,918,940 | A | 7/1999 | Wakamatsu et al. | |
| 6,120,098 | A * | 9/2000 | Magyar et al. | 297/367 R |
| 6,402,249 | B1 | 6/2002 | Rohee et al. | |
| 6,619,744 | B2 | 9/2003 | Reubeuze | |
| 6,663,180 | B2 | 12/2003 | LeTournoux | |
| 7,293,838 | B2 * | 11/2007 | Sugama et al. | 297/378.1 |
| 7,472,963 | B2 * | 1/2009 | Jeong | 297/463.1 |
| 7,494,186 | B2 * | 2/2009 | Paing et al. | 297/361.1 X |
| 2009/0026791 | A1 | 1/2009 | Ishijima et al. | |
| 2009/0026825 | A1 * | 1/2009 | Ishijima et al. | 297/358 |
| 2009/0058158 | A1 * | 3/2009 | Sobieski | 297/338 |
| 2010/0109406 | A1 | 5/2010 | Ueda | |

FOREIGN PATENT DOCUMENTS

| | | |
|---|---|---|
| DE | 10015772 | 6/2001 |
| FR | 2 770 181 | 4/1999 |
| GB | 2144511 | 3/1985 |
| JP | 61-5976 | 1/1986 |
| JP | S63-36423 | 9/1988 |
| JP | 63-60404 | 11/1988 |
| JP | 2-36757 | 10/1990 |
| JP | 4000854 | 1/1992 |
| JP | 8-26007 | 1/1996 |
| JP | 8-268128 | 10/1996 |
| JP | 2000-255295 | 9/2000 |
| JP | 2001-130294 | 5/2001 |
| WO | WO 2007/086466 A1 | 8/2007 |

OTHER PUBLICATIONS

K. Ueda, "Seat," U.S. Pat. Appl. No. 12/161,361, filed Jul. 18, 2008.
Supplementary European Search Report dated Jun. 18, 2009.

* cited by examiner

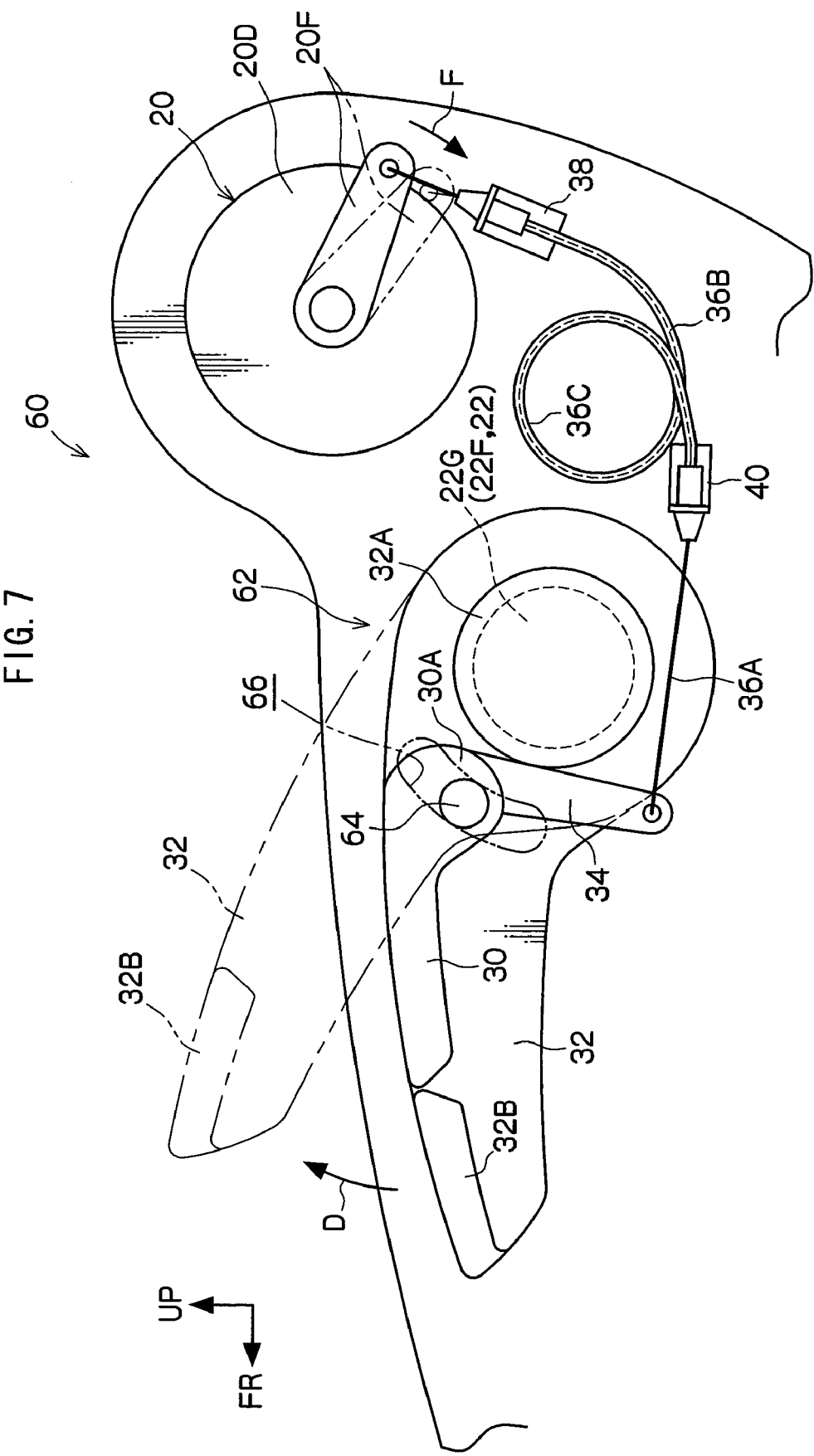

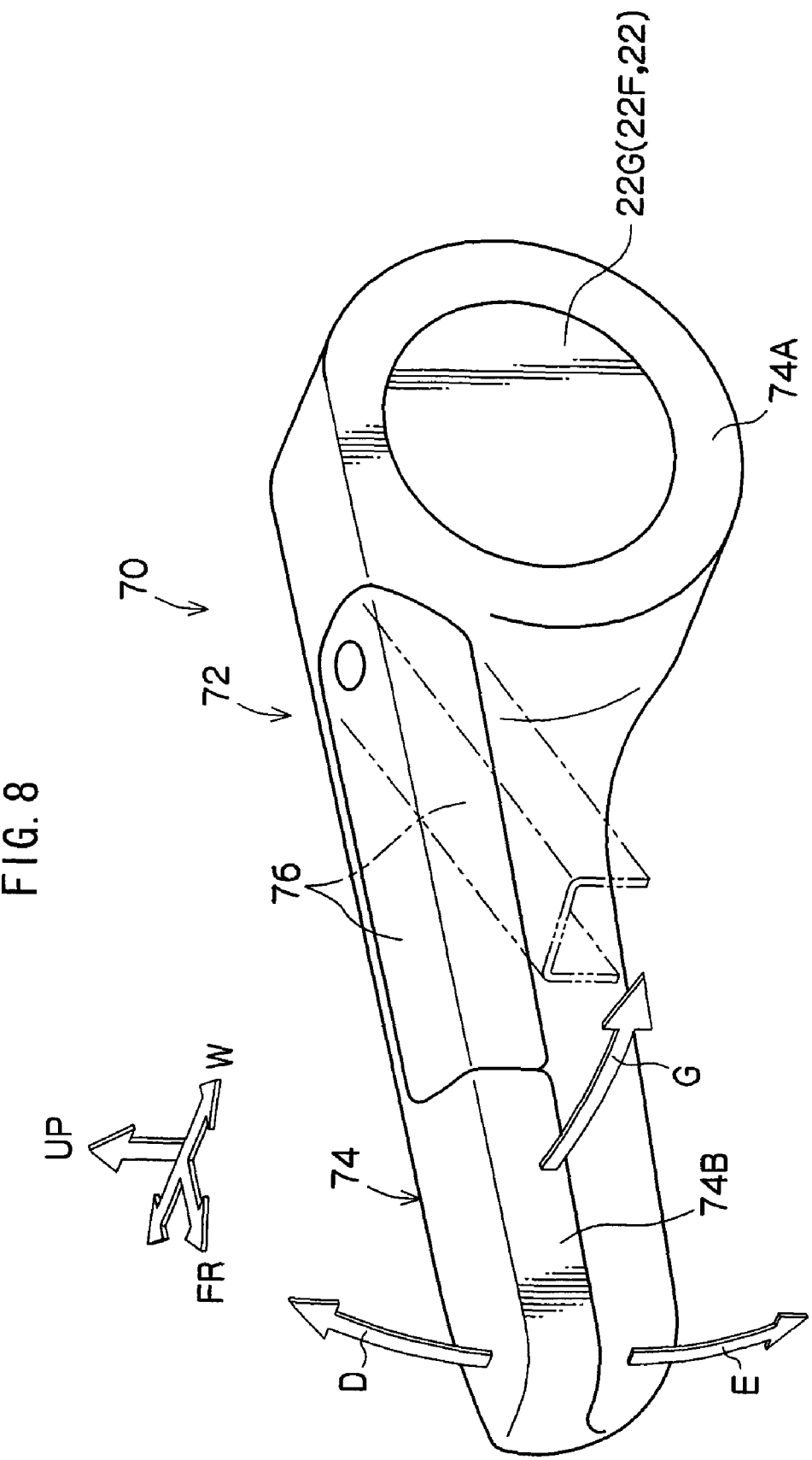

ADJUSTABLE SEAT INCLUDING OPERATING MEMBERS

CROSS-REFERENCE TO RELATED APPLICATIONS

This application is a national phase application of International Application No. PCT/JP2007/051180, filed Jan. 25, 2007, and claims the priority of Japanese Application No. 2006-019194, filed Jan. 27, 2006, the contents of both of which is incorporated herein by reference.

TECHNICAL FIELD

The present invention relates to a seat such as, for example, a seat mounted to an automobile for an occupant to sit on.

RELATED ART

Vehicle seats are known that are provided with an operation lever for releasing the lock of a reclining mechanism and making the adjustment of the angle of a seat back possible, and a knob for adjusting the height of a seat cushion rear portion (see, for example, Japanese Patent Application Laid-Open (JP-A) No. 2001-130294, No. 2000-255295). As the operation lever and the knob, these are each disposed at a distance from each other at a seat width direction outside edge portion, and are able to be operated independently so that they do not interfere with each other.

Vehicle seats are also known that are configured with a reclining lever that is operable in two stages, at the first stage of operation the lock of a reclining mechanism is released and adjustment of the angle of the seat back is made possible, and at the second stage of operation the adjustment of the angle of the seat back remains possible but the seat is configured such that a height lever is engaged and the seat is raised (see, for example, JP-A No. H8-26007).

DISCLOSURE OF THE INVENTION

Problem to be Solved by the Invention

However, in the first of the above described technologies, since the operation lever and the knob are provided as separate items, it is difficult to dispose both of these in positions that have good operability. On the other hand, in the second of the above described technologies, since the release of the lock of the height lock mechanism (operation of the height lever) cannot be carried out independently of the release of the reclining lock, this does not contribute to increased operability.

Consideration has been made of the above points and an object of the present invention is to provide a seat with good operability of plural operating members for operating plural adjustable units.

Method of Solving the Problem

A seat of a first aspect of the present invention includes: a first adjustable unit, provided to a seat body that is for sitting on, the first adjustable unit being adjusted by operation force transmitted from a first operating system; a second adjustable unit, provided to the seat body, the second adjustable unit being adjusted by operation force transmitted from a second operating system; and an operation force imparting unit, the operation force imparting unit provided to the seat body in a predetermined position that is operable by a seat occupant, and the operation force imparting unit being able to take up independently a first operation state in which operation force of the first operating system is input, and a second operation state in which operation force of the second operation system is input.

By the above aspect, when operation is carried out so that an operating portion is in the first operation state, the first adjustable unit is adjusted (mechanically) by this operation force, or the first adjustable unit is placed in a state in which it is adjustable by this operation force (such as releasing a locked state, for example). On the other hand, when operation is carried out so that an operating portion is in the second operation state, the second adjustable unit is adjusted by this operation force, or the second adjustable unit is placed in a state in which it is adjustable by this operation force.

Two adjustable units may thereby be independently adjusted by the operation force imparting unit that has been provided in a predetermined position to the seat body. By providing a single (common) operation force imparting unit with two operation force imparting functions, limitations to the disposal and size of the operational region of a seat occupant may be reduced, in comparison to configurations provided with two independent (separated) operation portions for operating two adjustable units, and an increase in the degrees of freedom for design may be achieved. By doing so, for example, by disposing an operation force imparting unit for achieving independent operation of two adjustable units to a seat body in a position that has good operability, it becomes possible to operate both of the two adjustable units with good operability.

In this manner, the seat of the above described aspect has good operability of plural operating members for operating plural adjustable units. It should be noted that there may be three or more adjustable units and the operation force imparting unit may be provided with three or more operation force imparting functions corresponding thereto.

In the above aspect, it is preferable that the operation force imparting unit includes: a first operating member, provided so as to be able to take up, by relative displacement with respect to the seat body, a non-operation position and an operation position, the first operating member being for adjusting the first adjustable unit by operation force from moving from the non-operation position to the operation position; a second operating member, provided so as to be able to take up, by relative displacement with respect to the seat body, a non-operation position and an operation position, the second operating member being for adjusting the second adjustable unit by operation force from moving from the non-operation position to the operation position; and an operation system support portion for supporting at least the first operating member such that the first operating member and the second operating member, when the first operating member and the second operating member are both in the non-operation position, overlap each other in their disposed spaces, or such that the operational spaces thereof overlap.

By the above aspect, the operation force imparting unit is configured to include a first operating member and a second operating member that are independently operable. When the first operating member is operated from the non-operation position to the operation position, the first adjustable unit is adjusted (mechanically) by this operation force, or the first adjustable unit is placed in a state in which it is adjustable by this operation force (such as by releasing a locked state, for example). On the other hand, when the second operating member is operated from the non-operation position to the operation position, the second adjustable unit is adjusted by this operation force, or the second adjustable unit is placed in a state in which it is adjustable by this operation force.

When the first operating member that is directly supported by the operation system support portion, and the second operating member that is directly or indirectly supported by the operation system support portion, are both in the non-operation position, at least a portion thereof overlap each other (occupy a common space), or the operational spaces (the movement paths to the operation position) of each other overlap, or the space occupied in the non-operation position of one or other thereof overlaps with the operational space of the other moving to the operation position. Thereby, the first operating member and the second operating member may each be disposed in positions with good operability. That is to say, there are limited positions with good operability for a seat occupant, but by overlapping the disposed position or the operational space of the first operating member and the second operating member, limitations on the disposal and size thereof may be reduced, and the degrees of freedom in design may be increased. Furthermore, by providing the first operating member and the second operating member so as to be independently operable, limitations on two adjustable unit with single operating member may be reduced.

In the above aspect, it is preferable that the second operating member in the non-operation position is contained in the first operating member positioned in the non-operation position.

By the above aspect, since the second operating member in the non-operation position is contained in the first operating member positioned in the non-operation position (the overlap is substantially complete) limitations to disposal of the first operating member and the second operating member are particularly reduced.

In the above aspect, it is preferable that the second operating member is supported by the first operating member so as to be able to relatively displace with respect to the seat body.

By the above aspect, the second operating member is supported by the operation system support portion (seat body) through the first operating member. Due to this, a configuration is realized in which interference is not readily generated by operation (movement to the operation position) of each of the first operating member and the second operating member.

In the above aspect, it is preferable that one end of the first operating member is supported by the seat body so as to be able to rotate around a predetermined axis, and the other end of the first operating member is operated so as to rotate around the predetermined axis; and the second operating member is supported by the first operating member such that the operation force when the second adjustable unit is being adjusted acts in a direction that is through the rotational axis of the first operating member.

By the above aspect, operation force is transmitted to the first adjustable unit by rotation of the first operating member about the predetermined axis, and operation force is transmitted to the second adjustable unit by movement of the second operating member from the non-operation position to the operation position. The second operating member is supported by the first operating member such that the operation force when the second operating member is being operated passes through (intersects with) the rotational axis of the first operating member, and inadvertent operation of the first operating member during the operation of the second operating member may be prevented.

In the above aspect, it is preferable that one end side in the seat front-rear direction of the first operating member is supported by the seat body so as to be able to rotate around an axis that is along the width direction of the seat, and the other end thereof in the seat front-rear direction is operated in the seat up-down direction; and one end side in the seat front-rear direction of the second operating member is supported by the seat body, or by the first operating member, so as to be able to rotate around an axis that is along the width direction of the seat, and the other end thereof in the seat front-rear direction is operated in the seat up-down direction.

By the above aspect, both the first operating member and the second operating member are supported so as to be able to independently rotate about axes along the seat width direction that are either coaxial or parallel, and end portions, at the opposite side in the front-rear direction to that of the supported ends, are operated substantially in the up-down direction. Since the operation directions of the first operating member and the second operating member are the same, they may both be imparted with an operation feel that does not feel awkward to a seat occupant (operator).

In the above aspect, it is preferable that the second operating member: is supported by the first operating member so as to be rotatable about a rotation axis that is parallel to the rotational axis of the first operating member, and is connected to the second adjustable unit through a cable so as to be adjustable; and a pulling direction of the cable, during operation for adjusting the second adjustable unit, passes through the rotational axis of the first operating member along the seat front-rear direction.

By the above aspect, when the first operating member is rotated around an axis that is along the seat width direction, operation force is transmitted to the first adjustable unit. When the second operating member is rotated about an axis that is along the seat width direction operation force is transmitted to the second adjustable unit. When this occurs, operation force is transmitted to the second operating member as a cable tensile force along the seat front-rear direction. Since the direction of action of the tensile force is through (intersects with) the rotational axis of the first operating member, inadvertent operation of the first operating member during the operation of the second operating member may be prevented.

In the above aspect, it is preferable that one end side in the seat front-rear direction of the first operating member is supported by the seat body so as to be able to rotate around an axis that is along the width direction of the seat, and the other end thereof in the seat front-rear direction is operated in the seat up-down direction; and one end side in the seat width direction of the second operating member is supported by the seat body, or by the first operating member, so as to be able to rotate around an axis that is along the front-rear direction of the seat, and the other end thereof in the seat width direction is operated in the seat up-down direction.

By the above aspect, the operation directions of the first operating member and the second operating member are different from each other, and therefore operation by a seat occupant of the operating member of the unintended adjuster may be prevented, and a good operation feeling may be imparted to the seat occupant.

In the above aspect, it is preferable that one end side in the seat front-rear direction of the first operating member is supported by the seat body so as to be able to rotate around an axis that is along the width direction of the seat, and the other end thereof in the seat front-rear direction is operated in the seat up-down direction; and one end side in the seat front-rear direction of the second operating member is supported by the seat body, or by the first operating member, so as to be able to rotate around an axis that is along the up-down direction of the seat, and the other end thereof in the seat front-rear direction is operated in the seat width direction.

By the above aspect, the operation directions of the first operating member and the second operating member are different from each other, and therefore operation by a seat occupant of the operating member of the unintended adjuster may be prevented, and a good operation feeling may be imparted to the seat occupant.

In the above aspect, it is preferable that the second operating member is supported by the first operating member so as to be able to relatively displace with respect to the seat body, and is connected to the second adjustable unit, through a cable of a covered cable that has a cover portion thereof fixed to the first operating member, so that the second adjustable unit is adjustable; and the covered cable has a length such that tension is not generated in the cover portion accompanying the movement of the first operating member to the operation position.

By the above aspect, when the second operating member is operated, the cable inside the covering is pulled (moves relative to the covering) and operation force is transmitted to the second adjustable unit. The length of the covered cable is set such that there is no tensile force to the cover portion even when the first operating member reaches the operation position (it is able to be absorbed by displacement of the cover portion), and therefore when the first operating member has been operated, a fixed end of the covering configuring the covered cable displaces with the first operating member. Therefore, there is no relative displacement generated between the second operating member (cable) that is supported by the first operating member and the covering, and operation force of the first operating member may be prevented from being transmitted to the second operating member.

In the above aspect, it is preferable that one end side in the seat front-rear direction of the first operating member is supported by the seat body so as to be able to rotate around an axis that is along the width direction of the seat, and the other end thereof in the seat front-rear direction is operated in the seat up-down direction; and the second operating member is supported by the first operating member so as to be able to move in the front-rear direction of the seat, and is operated in the seat front-rear direction.

By the above aspect, the operation directions of the first operating member and the second operating member are different from each other, and therefore operation by a seat occupant of the operating member of the unintended adjuster may be prevented, and a good operation feeling may be imparted to the seat occupant.

In the above aspect, it is preferable that a portion of the second operating member in the non-operation position projects out from an end portion in the seat front-rear direction of the first operating member, and is operated by pushing in toward the inside of the first operating member.

By the above aspect, in contrast to the rotational operation of the first operating member about an axis along the seat width direction, the second operating member being operated by pushing in toward the inside of the first operating member and the operation force is transmitted to the second adjustable unit. Therefore, the operation of the operation member for the unintended adjuster by a seat occupant may be reliably prevented.

In the above aspect, it is preferable that the second operating member is positioned in the seat front-rear direction to the opposite side of the first operating member rotational axis than the side of the second adjustable unit, and is connected by a linkage for transmitting operation force to the second adjustable unit; and the linkage comprises a link axis that is positioned coaxially to the rotational axis of the first operating member when the second operating member is in the state of being positioned in the non-operation position.

By the above aspect, when the second operating member is pushed in toward the second adjustable unit side relative to the first operating member, this pushing in operation force is mainly transmitted to the second adjustable unit as a compressive load of the linkage (link configuring the linkage). On the other hand, when the second operating member is in the state of being positioned in the non-operation position and the first operating member is operated, in the linkage, by the angular displacement at the link axis that is coaxial to the rotational axis of the first operating member, angular displacement to the operation position of the first operating member is permitted.

In this manner, since the linkage is used for load transmission from the second operating member to the second adjustable unit, the second operating member may be disposed to the opposite side of the rotational axis of the first operating member to that of the second adjustable unit, so that impeding of the operation of the first operating member may be avoided.

In the above aspect, it is preferable that the second adjustable unit comprises an arm member that converts operation force along the seat front-rear direction transmitted from the linkage to a moment about a predetermined axis along the seat width direction; and the linkage comprises a position for load input from the second operating member and a position for load output to the arm member that are different from each other in height in the seat up-down direction.

By the above aspect, when the linkage transmits operation force to the arm member, the second adjustable unit is adjusted by the moment that has been converted by the arm member. In the linkage, the load input position and the load output position have different heights, by an intermediate portion being bent or curved, for example. Therefore, it is possible to set the operation force and operational stroke of the second operating member.

For example, the linkage may be connected to a position on the arm member that is near to the predetermined axis of the second adjustable unit (shortening the moment arm), shortening the operation stroke, or the linkage may be connected to a position on the arm member that is far from the predetermined axis of the second adjustable unit (lengthening the moment arm), decreasing the operation force. In particular, a configuration in which the link on the second adjustable unit side of the link axis is provided with the above described bend or the like, without changing the position of the first operating member and second operating member relative to the second adjustable unit (seat body), the operation force and operation stroke may be set by changing to a shape of the link corresponding to the connection position of the arm member on the adjustable unit side.

In the above aspect, it is preferable that the seat further includes a link guide provided to the first operating member or to the seat body, the link guide restricting angular displacement of the linkage about the link axis accompanying movement of the second operating member from the non-operation position to the operation position.

By the above aspect, when the first operating member is not being operated, and also the second operating member is being operated, the angular displacement of the linkage at the link axis is restricted, therefore the operation force of the second operating member may be reliably transmitted to the second adjustable unit.

In the above aspect, it is preferable that the link guide is integrally formed to the first operating member.

By the above aspect, since the link guide is provided integrally to the first operating member, the structure is simple.

In the above aspect, it is preferable that the first operating member and the second operating member are disposed at the seat body at an edge portion thereof in the seat width direction; and the link guide is formed integrally to a cover member that configures the seat body and covers the linkage from the outside in the seat width direction.

By the above aspect, since the link guide is formed integrally to a cover member that covers the linkage that is disposed to the seat body at a seat width direction edge portion (side portion), the structure is simple.

In the above aspect, it is preferable that a portion of the second operating member in the non-operation position projects out from an end portion in the seat front-rear direction of the first operating member, and is operated by pulling in a direction that is out from the first operating member.

By the above aspect, in contrast to the rotational operation of the first operating member about an axis along the seat width direction, the second operating member is operated by pulling out from the first operating member and the operation force is transmitted to the second adjustable unit. Therefore, the operation of the operation member for the unintended adjuster by a seat occupant may be reliably prevented.

In the above aspect, it is preferable that the second operating member is positioned in the seat front-rear direction to the opposite side of the first operating member rotational axis than the side of the second adjustable unit, and is connected by a linkage for transmitting operation force to the second adjustable unit; and the linkage includes a link axis that is positioned coaxially to the rotational axis of the first operating member when the second operating member is in the state of being positioned in the non-operation position.

By the above aspect, when the second operating member is pulled out toward the opposite side of the first operating member to that of the second adjustable unit, this pulling out operation force is mainly transmitted as a pulling tensile load to the second adjustable unit by the linkage (a link configuring the linkage). On the other hand, when the second operating member is in the state of being positioned in the non-operation position and the first operating member is operated, in the linkage, by the angular displacement at the link axis that is coaxial to the rotational axis of the first operating member, angular displacement to the operation position of the first operating member is permitted.

In this manner, since the linkage is used for transmitting load from the second operating member to the second adjustable unit, the second operating member may be disposed at the opposite side of the rotational axis of the first operating member to that of the second adjustable unit, so that impeding of the operation of the first operating member may be avoided.

In the above aspect, it is preferable that the second operating member is positioned in the seat front-rear direction to the opposite side of the first operating member rotational axis than the side of the second adjustable unit, and is connected by a cable such that operation force is able to be transmitted to the second adjustable unit.

By the above aspect, when the second operating member is pulled out toward the opposite side of the first operating member to that of the second adjustable unit, this pulling out operation force is mainly transmitted as a tensile force of the cable to the second adjustable unit. On the other hand, when the second operating member is in the state of being positioned in the non-operation position and the first operating member is operated, angular displacement to the operation position of the first operating member is permitted by appropriate flexing of the cable.

In this manner, since the cable is used for transmitting load from the second operating member to the second adjustable unit, the second operating member may be disposed at the opposite side of the rotational axis of the first operating member to that of the second adjustable unit, so that impeding of the operation of the first operating member may be avoided.

In the above aspect, it is preferable that the first adjustable unit is a height adjustment mechanism for adjusting the position of the seat body in the up-down direction.

By the above aspect, the height adjustment mechanism is operated by the operation force from the operation of the first operating member, and the seat height is adjusted. By, for example, using a first operating member that may be made relatively large (in comparison with the second operating member) for the seat height adjustment application that has relatively a large operation amount of operation load, good operability may be obtained for the seat height adjustment.

In the above aspect, it is preferable that the second adjustable unit is a reclining mechanism for switching between a locked state of an angle of a seat back with respect to a seat cushion, and a lock released state thereof.

By the above aspect, the lock releasing of the reclining mechanism is carried out by the operation force of operating the second operating member. By, for example, using a second operating member that may be made relatively small (in comparison with the first operating member) for a normally one-operation lock releasing application, the first operating member may be used for another application with relatively large operation force and operation amount (such as, for example, the height adjustment of claim 21).

Effect of the Invention

The seat according to the present invention as has been explained above, has the superior effect of good operability of plural operating members for operating plural adjustable units.

BRIEF DESCRIPTION OF THE DRAWINGS

FIG. 7 is a side view of a seat lifter operation state of an operation force imparting unit of a vehicle seat according to a third exemplary embodiment of the present invention;

FIG. 8 is a perspective view of an operation force imparting unit of a vehicle seat according to a fourth exemplary embodiment of the present invention;

BEST MODE OF IMPLEMENTING THE INVENTION

Explanation will now be given regarding the vehicle seat 10 as a seat according to a first exemplary embodiment of the present invention, with reference to FIGS. 1 to 5. It should be noted that in each of the figures appropriately shown arrow FR, arrow UP and arrow W represent, respectively, the front direction (direction of progression) of an automobile to which the vehicle seat 10 has been applied, the up direction thereof and the vehicle width direction, and these match the front direction, up direction and width direction of the vehicle seat 10. When reference is simply made below to the front-rear direction, up-down direction and width direction this indicates respective directions with reference to the above described vehicle seat (automobile).

Figure 3:
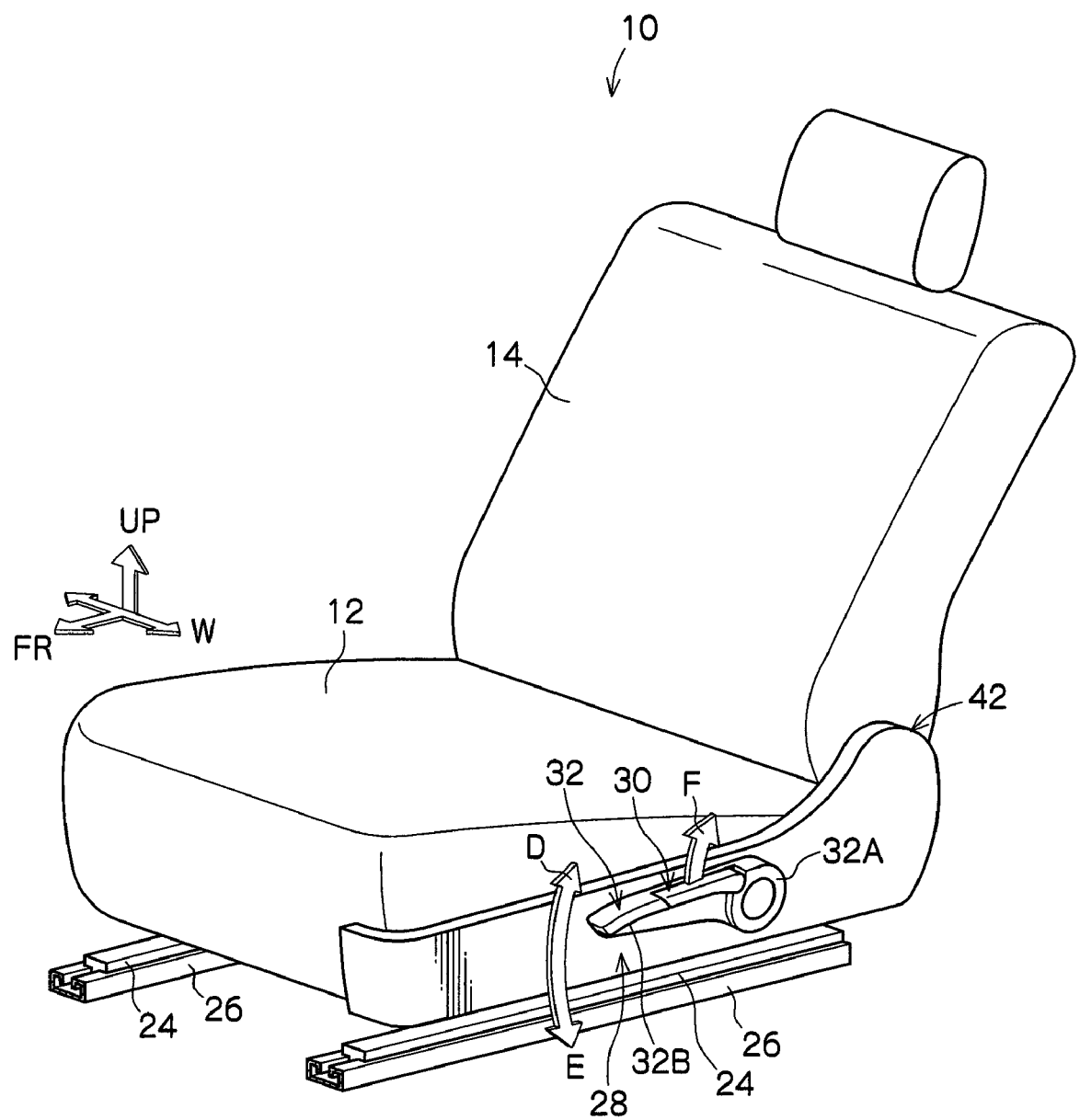
FIG. 3 is a perspective view showing the overall configuration of a vehicle seat according to the first exemplary embodiment of the present invention.
Figure 5:
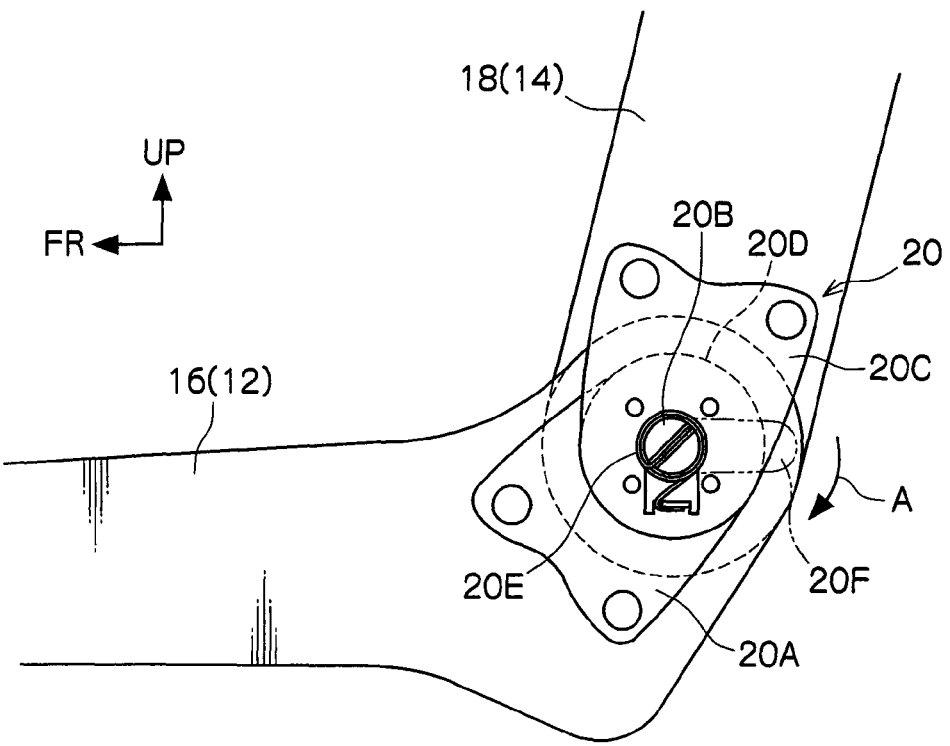
FIG. 5 is side view showing a reclining mechanism of a vehicle seat according to the first exemplary embodiment of the present invention.

FIG. 3 shows an outline of the overall configuration of the vehicle seat 10 in perspective view. As shown in the figure, the vehicle seat 10 is provided with a seat cushion 12 that is for an occupant for sitting on and a seat back 14, supporting the upper body of a seated occupant from the rear. As shown in FIG. 5, the back edge portion of a seat cushion frame 16 configuring the seat cushion 12, and the bottom edge portion of a seat back frame 18 configuring the seat back 14, are connected together, in such a way that the relative angle therebetween may be adjusted, a through reclining mechanism 20 serving as a second adjustable unit. There is a reclining mechanism 20 provided at both sides in the width direction, and the reclining mechanisms 20 are coupled together by a non illustrated interlocking mechanism.

As shown in FIG. 5, the reclining mechanism 20 is configured including main components of: a cushion side bracket 20A, which is fixed to the seat cushion frame 16; a back side bracket 20C, which is connected to the cushion side bracket 20A through a reclining shaft 20B and is also fixed to the seat back frame 18; a lock connecting portion 20D, which has the relative angle of the cushion side bracket 20A and the back side bracket 20C adjustable in plural stages, or continuously adjustable, about the reclining shaft 20B, and which may be locked at a desired angle; and a torsion spring 20E, which biases the lock connecting portion 20D to the lock side to inhibit relative angular displacement between the cushion side bracket 20A and the back side bracket 20C. Also, the reclining mechanism 20 that is on one side in the seat width direction (on the vehicle width direction outside, for example) is provided with a lock release arm 20F that has been connected at one end in the length direction thereof to the reclining shaft 20B and is rotatable as one therewith. Since the lock connecting portion 20D may be obtained from various known structures, explanation of the structure thereof will be omitted.

This pair of reclining mechanisms 20 is configured so that, when the lock connecting portion 20D is in the locked state, a desired angle of inclination of the seat back 14 (seat back frame 18) with respect to the seat cushion 12 (seat cushion frame 16) is maintained. Furthermore, when in the pair of reclining mechanisms 20 the lock release arm 20F rotates in the direction of arrow A, as shown in FIG. 5, against the biasing force of the torsion spring 20E, then the respective lock connecting portions 20D are released from the locked state by the rotation directly, or by the rotation transmitted by the interlocking mechanism.

There is a non illustrated return spring disposed between the seat cushion 12 and the seat back 14, and when each of the reclining mechanisms 20 is in the lock released state and there is no load on the seat back 14 then the seat back 14 tilts forward to a predetermined position relative to the seat cushion 12. However, when each of the reclining mechanisms 20 is in the lock released state and a load of a predetermined value or above acts toward the rear on the seat back 14, the seat back 14 tilts to the rear relative to the seat cushion 12. Also, when the operation force of the lock release arm 20F is released when the seat back 14 is at a desired angle of inclination relative to the seat cushion 12, the reclining mechanisms 20 return to the locked state due to the biasing force of the torsion spring 20E, and the seat back 14 is maintained at the desired angle of inclination relative to the seat cushion 12.

The lock release of the reclining mechanisms 20 is achieved by operation force from a reclining lever 30 being transmitted by a covered cable 36 serving as a second operation system (these will be described later) to the lock release arm 20F.

Figure 4:
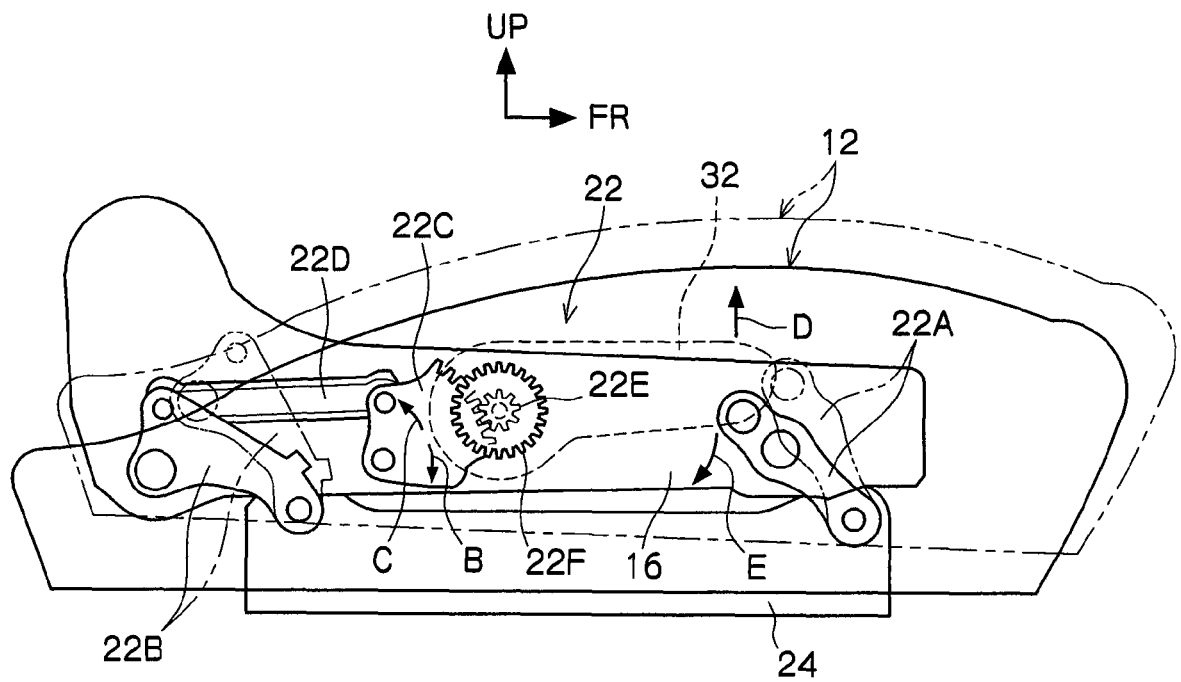
FIG. 4 is a side view showing a seat lifter of a vehicle seat according to the first exemplary embodiment of the present invention.

The vehicle seat 10 is also provided with a seat lifter 22 like the one shown in FIG. 4, serving as a first adjustable unit (first or second adjustable unit). The seat lifter 22 is provided with a pair of front-rear links 22A, 22B that each have top and bottom ends thereof rotatably connected to an upper rail 24 and to the seat cushion frame 16, and the front-rear links 22A, 22B together with the upper rail 24 and the seat cushion frame 16 configure a quadric crank chain. The upper rail 24 is supported so as to be able to slide in the front-rear direction on lower rails 26 (see FIG. 3), which are fixed to the vehicle body floor.

The front-rear links 22A, 22B are disposed such that two-dot chain lines connecting top and bottom connecting portions (rotational shafts) of each are substantially parallel to each other and inclined down toward the rear, and it is configured such that, by changing the rearward angle of inclination, the seat cushion frame 16 may be moved in the up-down direction relative to the upper rail 24 and moved toward or away from the upper rail 24. It should be noted that in FIG. 4 the solid lines and the two-dot chain lines show respectively the lower limit position and the upper limit position of the seat cushion frame 16 (seat cushion 12) relative to the upper rail 24.

There is also a lifter gear 22C provided to the seat lifter 22 and rotatably axially supported on the seat cushion frame 16, and a front end portion of a connecting link 22D is connected rotatably to the upper portion of a rotational shaft of the lifter gear 22C. The rear end portion of the connecting link 22D is connected rotatably to the upper part of the connecting portion of the link 22B with the seat cushion frame 16. Thereby, in the seat lifter 22, when the lifter gear 22C is rotated in the direction of arrow B, the link 22B rotates to the standing up direction side and the seat cushion frame 16 displaces upward, and when the lifter gear 22C is rotated in the opposite direction to that of arrow B, in the direction of arrow C, then the link 22B rotates to incline toward the rear and the seat cushion frame 16 displaces downward.

The seat lifter 22 is provided with a pinion 22E that is meshed with the lifter gear 22C, and the pinion 22E is connected to a lifter knob 32, described later, through a pump lifter mechanism 22F, serving as a first operating system. The pump lifter mechanism 22F is supported on the seat cushion frame 16, and the lifter gear 22C is rotated in the direction of arrow B, through the pinion 22E, by the rotation of lifter knob 32 in the direction of arrow D, and it is configured such that when the lifter knob 32 is being returned from a rotational direction at the arrow D side (referred to below as the upper side operation position) to a neutral position that is a non-operation position, operation force is not transmitted to the pinion 22E.

In the same manner, the pump lifter mechanism 22F rotates the lifter gear 22C in the direction of arrow C, through the pinion 22E, by the rotation of the lifter knob 32 in the direction of arrow E, and it is configured such that when the lifter knob 32 is being returned from a rotational position at arrow E side (referred to below as the lower operation position) to a neutral position, operation force is not transmitted to the pinion 22E.

The pump lifter mechanism 22F also has a braking function such that the pinion 22E does not rotate in the reverse direction due to force from the lifter gear 22C side. It should be noted that there is a biasing member included in the pump lifter mechanism 22F that biases the lifter knob 32 to toward the neutral position, and there is no requirement for operation force to return the lifter knob 32 to the neutral position.

By the above, the seat lifter 22 raises the seat cushion 12 relative to the vehicle body floor with a reciprocating swinging movement by rotation of the lifter knob 32 from between the neutral position and the rotational position on the direction of arrow D side, and the seat lifter 22 lowers the seat cushion 12 relative to the vehicle body floor with a reciprocating swinging movement by rotation of the lifter knob 32 between the neutral position and the rotational position on the direction of arrow E side. Also, the seat cushion 12 may be maintained at a desired height against a seating load.

As shown in FIG. 3, at a width direction portion of the seat cushion 12 (at the vehicle width direction outside, for example) there is disposed an operation force imparting unit 28, for adjusting the reclining angle of the vehicle seat 10 and the height relative to the floor thereof. In this exemplary embodiment the operation force imparting unit 28 is disposed so that it may be operated by the seat occupant from the width direction outside of a cover member 42 that covers a portion of the edge of the seat cushion 12 and the reclining mechanism 20 from the width direction outside.

Figure 1:
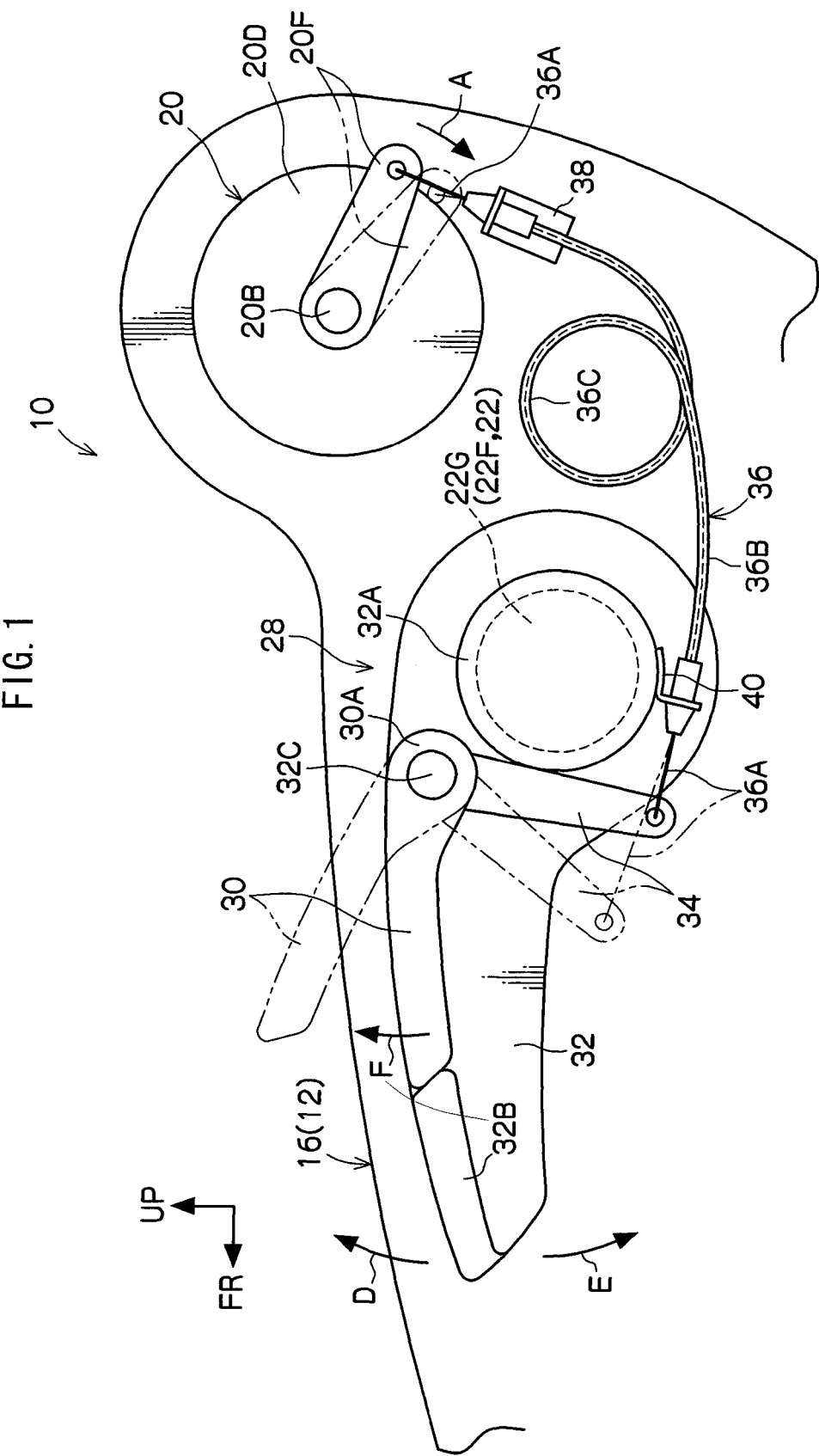
FIG. 1 is a side view of a reclining operation state of an operation force imparting unit of a vehicle seat according to a first exemplary embodiment of the present invention.

The operation force imparting unit 28, as shown in FIG. 1 and FIG. 3, is configured with the reclining lever 30, serving as a second operating member, for operating the reclining mechanism 20, and the lifter knob 32, serving as a first operating member, for operating the seat lifter 22.

The lifter knob 32 is long in the front-rear direction, and there is a lifter connecting portion 32A provided extending out to the width direction outside at the rear end thereof, and the lifter connecting portion 32A is connected coaxially to an operation load input portion 22G of the seat lifter 22 (pump lifter mechanism 22F) and is fixed thereto so as to rotate as one therewith. Also, there is a substantially bow-shaped handle portion 32B, curved along the upper edge, protruding to the width direction outside from the front end portion of the lifter knob 32. Thereby, a seat occupant of the vehicle seat 10 operates the lifter knob 32 to the direction of arrow D side relative to the neutral position by holding the lifter knob 32 with their fingers from the lower face of the handle portion 32B and pulling up, and the seat occupant operates the lifter knob 32 to the direction of arrow E side relative to the neutral position by pushing the upper surface of the handle portion 32B down using the palm of their hand.

It is thereby configured such that operation force, from swinging operation of the lifter knob 32 to the direction of arrow D side or the direction of arrow E side relative to the neutral position (relative displacement to the seat cushion 12), is transmitted through the operation load input portion 22G, the pump lifter mechanism 22F and the pinion 22E to the lifter gear 22C. Namely, the lifter knob 32 that is directly fixed to the seat lifter 22 directly transmits operation force to the seat lifter 22, and adjustment of the height of the seat cushion 12 is carried out by the seat lifter 22 using the operation force from the lifter knob 32 (the force of operation by a seat occupant).

With the operation force imparting unit 28 the reclining lever 30 is supported on the lifter knob 32 so as to be able to relatively displace with respect to each of the lifter knob 32 and the seat cushion 12. Specifically, there is a support shaft 32C that protrudes out toward the outside in the width direction from a rear portion of the lifter knob 32, with the axis along the width direction. The reclining lever 30 that has its length along the front-rear direction has a shaft support portion 30A, formed at a rear end portion thereof, that is fitted with clearance over the support shaft 32C, and the reclining lever 30 is supported so as to be able to rotate about the axis of the support shaft 32C. The reclining lever 30, by this rotational movement, is able to take up a non-operation position shown by the solid lines in FIG. 1, and an operation position to the direction of arrow F side from the non-operation position. In this exemplary embodiment the seat cushion frame 16, supporting the lifter knob 32 through the seat lifter 22, corresponds to the operation system support portion of the present invention.

As is shown in FIG. 1, the reclining lever 30 positioned in the non-operation position takes up a shape, in side view, with the upper edge of the reclining lever 30 along the upper edge of the lifter knob 32, continuous to the rear portion of the handle portion 32B. Therefore, the reclining lever 30 positioned in the non-operation position overall, in side view, overlaps with the lifter knob 32 positioned in the neutral position, and is configured to be contained in the lifter knob 32. Also, as shown in FIG. 3, the reclining lever 30 positioned in the non-operation position, in plan view, is incorporated between the lifter connecting portion 32A and the handle portion 32B, and in such a plan view is contained in the lifter knob 32.

Furthermore, as shown in FIG. 1, the rear end portion of the handle portion 32B contacts with the front end portion of the reclining lever 30 so as to receive the reclining lever 30 positioned in the non-operation position from the bottom side thereof. Namely, the handle portion 32B functions as a stopper, and due to this the reclining lever 30 is restricted from moving to the opposite side to that of the direction of arrow F with respect to the non-operation position.

Also, as shown in FIG. 1, there is an arm 34 that protrudes out substantially downward from the shaft support portion 30A of the reclining lever 30. The arm 34 rotates around the support shaft 32C as one with the reclining lever 30. It should be noted that the arm 34 may be given the functionality of a stopper preventing the movement of the reclining lever 30 to the opposite side to that of the direction of arrow F with respect to the non-operation position. The reclining lever 30 is connected, through this arm 34 and the covered cable 36, so as to be able to impart the operation force to the reclining mechanism 20.

Specifically, the covered cable 36 is configured with a cable 36A covered with a covering 36B. The covering 36B is fixed at one end thereof by a cable fixing bracket 38 that is fixed to the seat cushion frame 16 (the cushion side bracket 20A side) and at the other end thereof by a cable fixing bracket 40 that is fixed to the lifter connecting portion 32A of the lifter knob 32 (the operation load input portion 22G). The cable 36A protrudes out from the covering 36B at both ends, and one end of the cable 36A is anchored to the free end side of the lock release arm 20F, and also the other end is anchored to the free end side of the arm 34.

Figure 2:
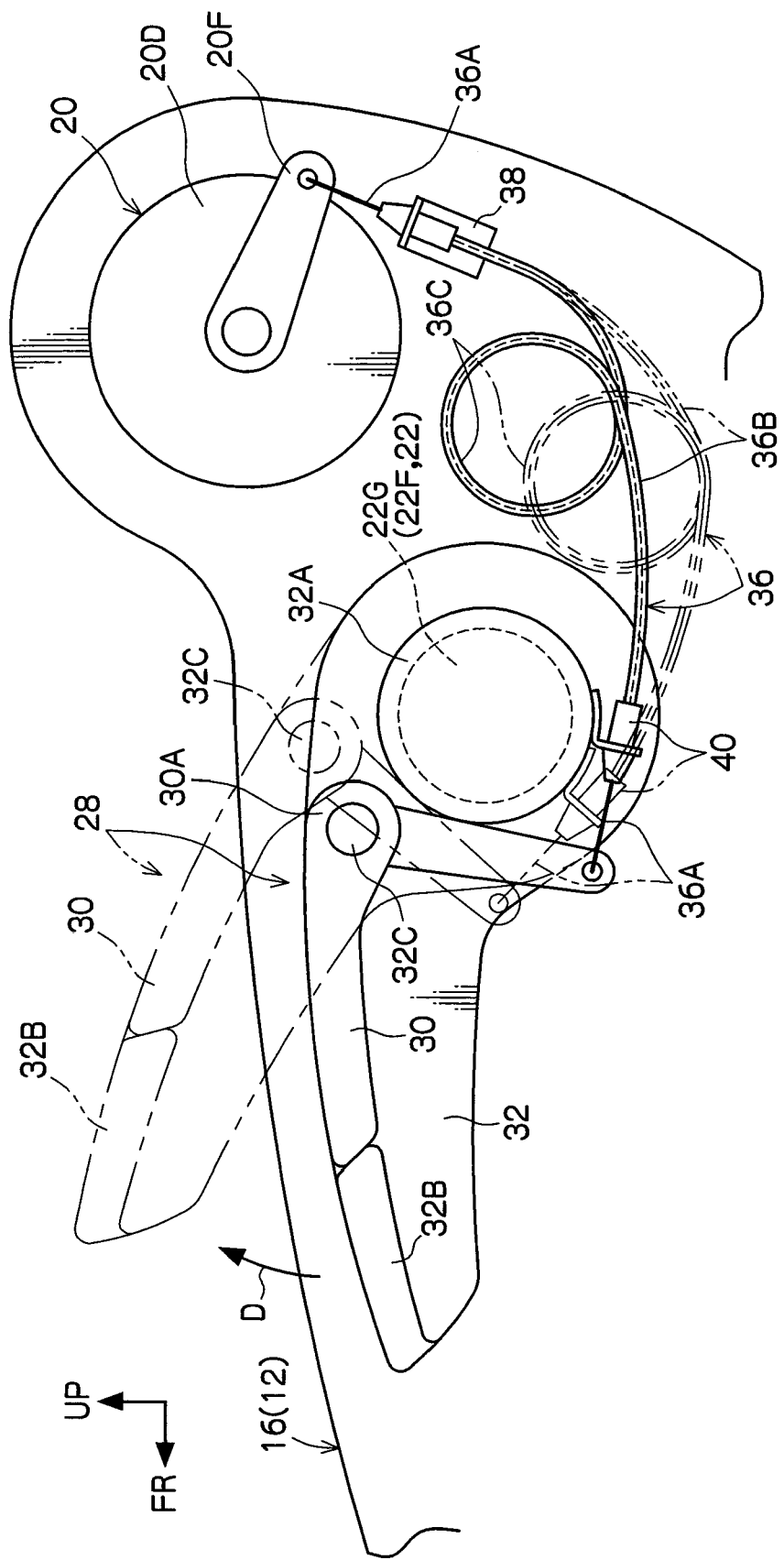
FIG. 2 is a side view of a seat lifter operation state of an operation force imparting unit of a vehicle seat according to the first exemplary embodiment of the present invention.

There is a loop 36C formed at an intermediate portion in the length direction of the covered cable 36, so as to be able to absorb the stroke of the relative movement of the cable fixing bracket 40 with respect to the cable fixing bracket 38. Thereby the operation force imparting unit 28 is configured such that, as shown in FIG. 2, when the lifter knob 32 has been operated, the covered cable 36 does not impede the operation (the stroke between the neutral position and the upper and lower operation positions) of the lifter knob 32. Furthermore, by the cable fixing bracket 40 rotationally moving as one with the lifter knob 32, or in other words, by the cable fixing bracket 40 following the reclining lever 30 positioned in the non-operation position relative to the lifter knob 32, the operation force of the lifter knob 32 is not transmitted to the reclining mechanism 20.

Then, when the reclining lever 30 is operated from the non-operation position to the operation position, as shown by the two-dot chain lines in FIG. 1, this operation force is transmitted to the lock release arm 20F via the cable 36A, and the locked state of the reclining mechanism 20 by the lock connecting portion 20D is released. It is configured such that when the operation force of the reclining lever 30 is removed, the reclining mechanism 20 returns to the locked state due to the biasing force of the torsion spring 20E, and the reclining lever 30 to which this biasing force has been transmitted via the cable 36A is returned to the non-operation position.

It should be noted that the lifter connecting portion 32A of the lifter knob 32 configuring the rear portion of the operation force imparting unit 28, the arm 34, and the cable fixing bracket 40 are covered from the width direction outside by the cover member 42.

Explanation will now be given of the operation of the first exemplary embodiment.

In the vehicle seat 10 configured as described above, when a seat occupant is adjusting in the height direction, the seat occupant holds (grips) the handle portion 32B of the lifter knob 32 with their fingers, and swings (reciprocatingly rotates) the lifter knob 32 between the neutral position and the upper operation position. In the operation of the lifter knob 32, the operation force that accompanies the movement of the lifter knob 32 toward the upper operation position from the neutral position is transmitted to the seat lifter 22, and the seat cushion 12, that is to say the vehicle seat 10, is displaced overall in the upward direction. When the operation of the lifter knob 32 is stopped at a desired height, the seat cushion 12 is maintained at the height to which it has been adjusted by the seat lifter 22.

In the same manner, when the seat occupant is adjusting the seating height in the lowering direction, the seat occupant gradually pushes the handle portion 32B of the lifter knob 32, and the lifter knob 32 swings (reciprocatingly rotates) between the neutral position and the lower operation position. In the operation of the lifter knob 32, the operation force that accompanies movement of the lifter knob 32 from the neutral position to the lower operation position is transmitted to the seat lifter 22, and the seat cushion 12, that is to say the vehicle seat 10, is displaced overall downward. When operation of the lifter knob 32 is stopped at the desired height, the height of the seat cushion 12 is maintained at the height to which it has been adjusted by the seat lifter 22.

On the other hand, when the seat occupant is adjusting the angle of the seat back 14 relative to the seat cushion 12, the seat occupant holds the reclining lever 30 and pulls the reclining lever 30 up from the non-operation position to the upper operation position. By doing so, the cable 36A relatively displacing with respect to the covering 36B rotates the lock release arm 20F to the direction of arrow A side, and the lock of the reclining mechanism 20 is released. The seat occupant places their body weight against the seat back 14, tilts the seat back 14 backward, and stops at the desired position, or stops the seat back 14, which is swinging up with the biasing force of the return spring, at the desired position. When the seat occupant releases the operation force from the reclining lever 30, the reclining mechanism 20 returns to the locked state by the biasing force of the torsion spring 20E, and the reclining lever 30 returns to the non-operation position.

In the vehicle seat 10, since when each of the reclining lever 30 and the lifter knob 32 are positioned in the non-operation position (neutral position) they are in a state of mutual overlap, the reclining lever 30 and the lifter knob 32 may both be disposed in positions that have good operability for a seat occupant. In particular, in the operation force imparting unit 28 configuring the vehicle seat 10, the reclining lever 30 in the non-operation position is configured to be contained in the lifter knob 32, and therefore a configuration may be realized in which both of these components are disposed in limited positions that have good operability for a seat occupant.

Figure 22:
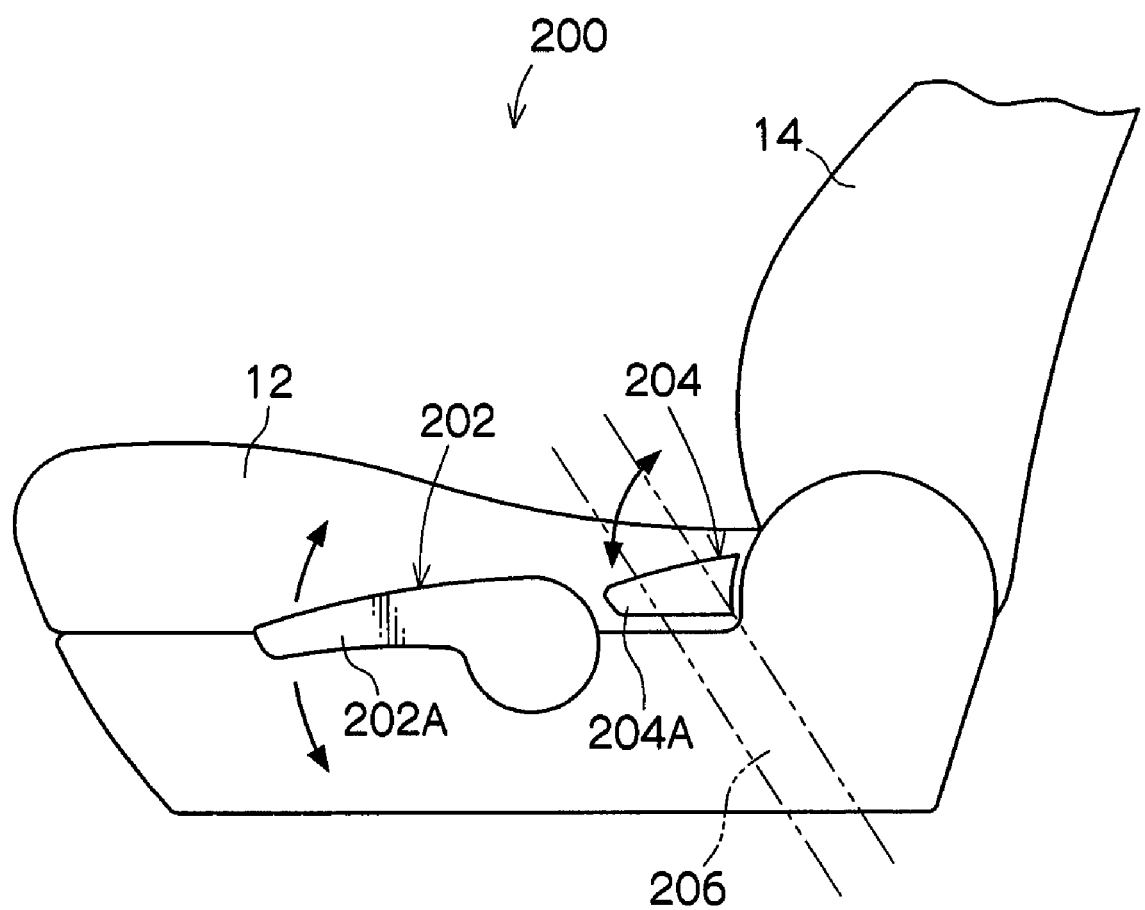
FIG. 22 is a side view showing a seat according to a comparative example to that of a vehicle seat according to an exemplary embodiment of the present invention.

Furthermore, comparing such a configuration with that of a comparative example of FIG. 22, in a vehicle seat 200 according to the comparative example operating portions 202A, 204A, for a seat occupant to independently operate a lifter knob 202 for use in adjusting the height of the seat and operating a reclining lever 204 for use in releasing the reclining lock, are disposed a large distance apart. Due to this, the necessary minimum dimensions and space for independent operation must be secured for each of the lifter knob 202 and the reclining lever 204, and there are many restrictions on the dimensions, shape and arrangement thereof. Specifically, in the vehicle seat 200, only one of the operating portions 202A, 204A can be placed in a position that has good operability for a seat occupant, and in the comparative example, since the position of the reclining lever 204 is toward the rear, it is not easily reached, and there is a worry that the seatbelt device 206 (buckle anchor portion) might interfere therewith. Furthermore, the arm length (front-rear length) of both the lifter knob 202 and the reclining lever 204 are restricted to being short, and so there is a limit to the reduction that may be made to the operation force. Also, since precedence is given to securing the functionality of each of the lifter knob 202 and the reclining lever 204 within the above described limited space, there is little degree of freedom for decoration and design in the vehicle seat 200.

In this manner, in a vehicle seat, there is a limited range that provides good operability for a seat occupant, but with the vehicle seat 10, since there is the operation force imparting unit 28 in which the arrangement space when the reclining lever 30 and the lifter knob 32 are not in operation, and a portion of the operation space thereof, are made common, the limitations to the arrangement and size of the reclining lever 30 and the lifter knob 32 are reduced, and an increase in the degrees of freedom for design is achieved. In the vehicle seat 10, for example, by configuring a single operation force imparting unit 28, interference of both the reclining lever 30 and the lifter knob 32 with the buckle may be avoided, and also the operation force imparting unit 28 may be disposed with the two operating systems included in suitably placed positions that are easily reached, and furthermore it is easy to secure sufficient arm lengths of the two operating systems such that the operation force and the operation stroke may be appropriately set.

Also, in the vehicle seat 10, since the reclining lever 30 is supported on the lifter knob 32 so as to be able to rotate around the support shaft 32C, or in other words, since the reclining lever 30 follows the operation of the lifter knob 32 while remaining in the non-operation position (supported state), the reclining lever 30 may be prevented from interfering with the movement of the lifter knob 32. However, since the loop 36C is formed in the covered cable 36 and also the cable fixing bracket 40 is fixed to the lifter knob 32, or in other words, since the relative position (state) is constant between the reclining lever 30 and the cable fixing bracket 40 during the operation of the lifter knob 32, as described above, a configuration is realized in which the reclining lever 30 is supported by the lifter knob 32 and yet the operation force of the lifter knob 32 is not transmitted to the reclining mechanism 20.

In the vehicle seat 10 the reclining lever 30 and the lifter knob 32 are both able to rotate about axial shafts that are parallel to each other and that are along the vehicle width direction, so that the front portions thereof are operated in the up-down direction, or in other words, since the operation direction of the reclining lever 30 and the lifter knob 32 are substantially the same as each other, they may both be imparted with an operation feel that does not feel awkward to the seat occupant (operator).

In this manner, in the vehicle seat 10 according to the first exemplary embodiment, there is good operability of the operation force imparting unit 28 that includes the reclining lever 30 and the lifter knob 32 for operating plural adjustable units.

Explanation will next be given of another exemplary embodiment of the present invention. It should be noted that components and parts which are fundamentally the same as those of the above first exemplary embodiment, or previous configurations, are allocated the same reference numerals as those of the above first exemplary embodiment, or previous configurations, and explanation thereof is sometimes omitted.

Second Exemplary Embodiment

Figure 6:
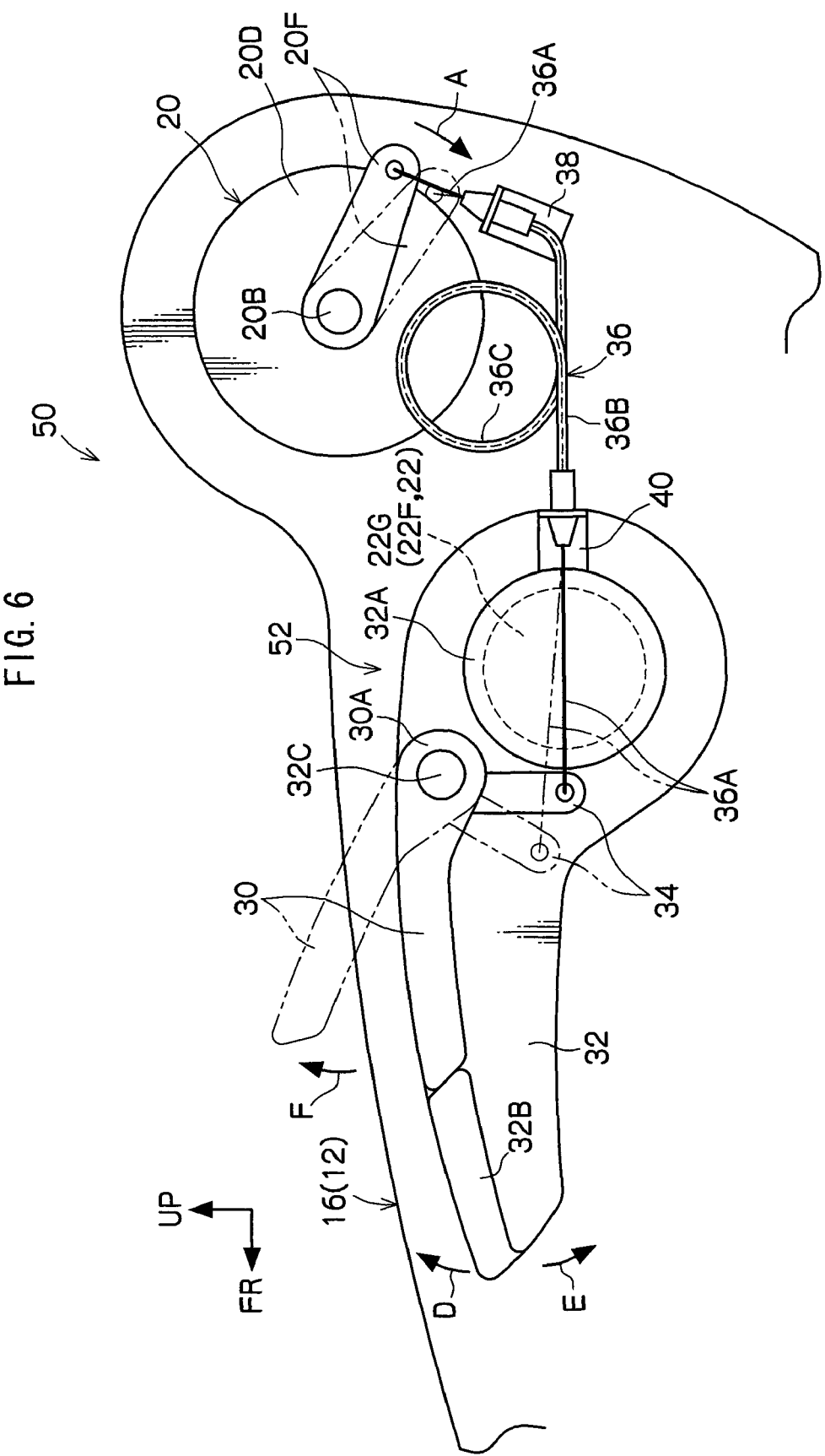
FIG. 6 is a side view of a reclining operation state of an operation force imparting unit of a vehicle seat according to a second exemplary embodiment of the present invention.

FIG. 6 shows a side view of an operation force imparting unit 52 configuring a vehicle seat 50 according to a second exemplary embodiment. As shown in the figure, the operation force imparting unit 52 is different from that of the first exemplary embodiment in that the phantom lines that connects the anchoring position of the cable 36A on the arm 34 with the fixing position of the covering 36B at the cable fixing bracket 40, is set so as to pass through the rotational axis of the lifter knob 32 (so as to intersect therewith).

Specifically, the arm 34 in the operation force imparting unit 52 is formed shorter than the arm 34 in the operation force imparting unit 28, and also the placement position of the cable fixing bracket 40 is moved to a rear end portion of the lifter knob 32 relative to the placement position thereof in the operation force imparting unit 28. Other parts of the configuration of the vehicle seat 50 are the same as the corresponding parts of the configuration of the vehicle seat 10.

Therefore, the same effects may be obtained by the vehicle seat 50 according to the second exemplary embodiment as with the same operation of the vehicle seat 10 according to the first exemplary embodiment.

In the vehicle seat 50, also, when the reclining lever 30 is operated from the non-operation position to the operation position, in the same manner as in the vehicle seat 10, the cable 36A is pulled and the lock of the reclining mechanism 20 is released, and accompanying this action, the arm 34 in the lifter knob 32 exerts a pulling force, through the cable 36A, on the cable fixing bracket 40. However, since the direction of action of the pulling force is substantially along the direction of passing through the rotational shaft axis of the lifter knob 32, the moment generated that is attempting to rotate the lifter knob 32 becomes extremely small. In doing so, in the vehicle seat 50, even if there is an excessive force operating on the reclining lever 30 supported by the lifter knob 32, unintentional operation of the lifter knob 32 accompanying this operating may be reliably prevented.

Third Exemplary Embodiment

In FIG. 7 is shown a side view of an operation force imparting unit 62 configuring a vehicle seat 60 according to a third exemplary embodiment As is shown in the figure, the operation force imparting unit 62 is different from the operation force imparting units 28, 52 according to the first and second exemplary embodiments in that the reclining lever 30 and the lifter knob 32 are each independently supported on the seat cushion frame 16.

Specifically, the reclining lever 30 is axially supported by a support shaft 64 that protrudes out to the outside in the width direction of the cover member 42 that has been fixed to the seat cushion frame 16. It should be noted that the support shaft 64 may be provided to the seat cushion frame 16. Also the cable fixing bracket 40 is fixed to the cover member 42. In the state in which the reclining lever 30 and the lifter knob 32 are both positioned in the non-operation position (neutral position) the relative positions of thereof are the same as the relative positions thereof in the first exemplary embodiment.

Also, the operation force imparting unit 62 is formed so that when the rear end of the handle portion 32B is operated to the upper side operation position of the lifter knob 32 there is no interference with the reclining lever 30. Due to this, the handle portion 32B is configured without stopper functionality for maintaining the reclining lever 30 in the non-operation position against the biasing force of the torsion spring 20E, and the stopper function is exhibited by the arm 34 and the lifter connecting portion 32A of the lifter knob 32 that are in mutual sliding contact.

Due to the above, in the operation force imparting unit 62 there are the reclining lever 30 and the lifter knob 32 that are operated independently (moved to their operation positions without coupling), and as shown by the two-dot chain lines in FIG. 7, it is configured such that when the lifter knob 32 is operated the reclining lever 30 remains in the non-operation position. Therefore, in the lifter knob 32 of this exemplary embodiment, there is a slit 66 formed in a circular arc shape along the operation path of the support shaft 64, for preventing interference with the support shaft 64. Other parts of the configuration of the vehicle seat 60 are the same as corresponding parts of the configuration of the vehicle seat 10.

Therefore, the same effects may be obtained by the vehicle seat 60 as with the same operation of the vehicle seat 10, except for the operational effect of the lifter knob 32 supporting the reclining lever 30. Also the configuration is with the reclining lever 30 and the lifter knob 32 arranged so as to overlap in the common operation force imparting unit 62, but since they are mutually independently operated, the operation force from one of the two is not transmitted to the other thereof.

It should be noted that in the above first to third exemplary embodiments, examples have been shown in which the reclining lever 30 and the lifter knob 32 are able to be rotationally operated about parallel shafts, however, the present invention is not limited thereto, and for example, the reclining lever 30 and the lifter knob 32 may be configured so as to be able to rotatably coaxially but independently from each other.

Fourth Exemplary Embodiment

FIG. 8 shows a perspective view of an operation force imparting unit 72 configuring a vehicle seat 70 according to a fourth exemplary embodiment. The operation force imparting unit 72, as shown in the figure, is different from the vehicle seat 10 according to the first exemplary embodiment in that there are provided, in place of the lifter knob 32 and the reclining lever 30 that each have an operation force applied thereto in the up-down direction, a lifter knob 74 and a reclining lever 76 that have operation forces applied thereto in directions that are different from each other. Specific explanation thereof will now be given.

The lifter knob 74 is formed in a shape that is similar to that of the lifter knob 32, and a lifter connecting portion 74A is provided at the rear end side thereof extending out to the outside in the width direction, the lifter connecting portion 74A being connected and fixed to the operation load input portion 22G in the seat lifter 22 (pump lifter mechanism 22F) so as to rotate coaxially and at one therewith. Furthermore, there is a handle portion 74B protruding out to the outside in the width direction from the front end portion of the lifter knob 74. Thereby, the lifter knob 74 is operated from the neutral position to the upper operation position by a seat occupant of the vehicle seat 70 holding the lower face of the handle portion 74B with their fingers and pulling up, and the seat occupant operates the lifter knob 74 from the neutral position to the lower operation position by pushing the upper surface of the handle portion 74B down using the palm of their hand.

The reclining lever 76, as with the reclining lever 30 relative to the lifter knob 32, is disposed, in the non-operation position, between the lifter connecting portion 74A and the handle portion 74B in plan view, and the top edge of the reclining lever 76 is positioned so as to follow along the top edge of the lifter knob 74 in side view. Therefore, the reclining lever 76 in the state of being positioned in the non-operation position is configured so as to be contained in the lifter knob 74. The reclining lever 76 is rotatably axially supported at a shaft support portion 76A, provide at a rear end portion thereof, by a support shaft 74C of the lifter knob 74. The support shaft 74C protrudes in the vicinity of the lifter connecting portion 74A of the lifter knob 74, such that the axis of the support shaft 74C is along the up-down direction.

The reclining lever 76, by rotation in the direction of arrow G about the support shaft 74C, is configured so as to be able to take up an operation position, as shown by the two-dot chain lines, relative to the non-operation position shown by the solid lines in FIG. 8, by the front end thereof moving to the outside in the width direction. As shown by the two-dot chain lines, the reclining lever 76 is formed in a U-shape that is open to the bottom in front view, and is a shape that is easily held in the fingers.

Figure 9A:
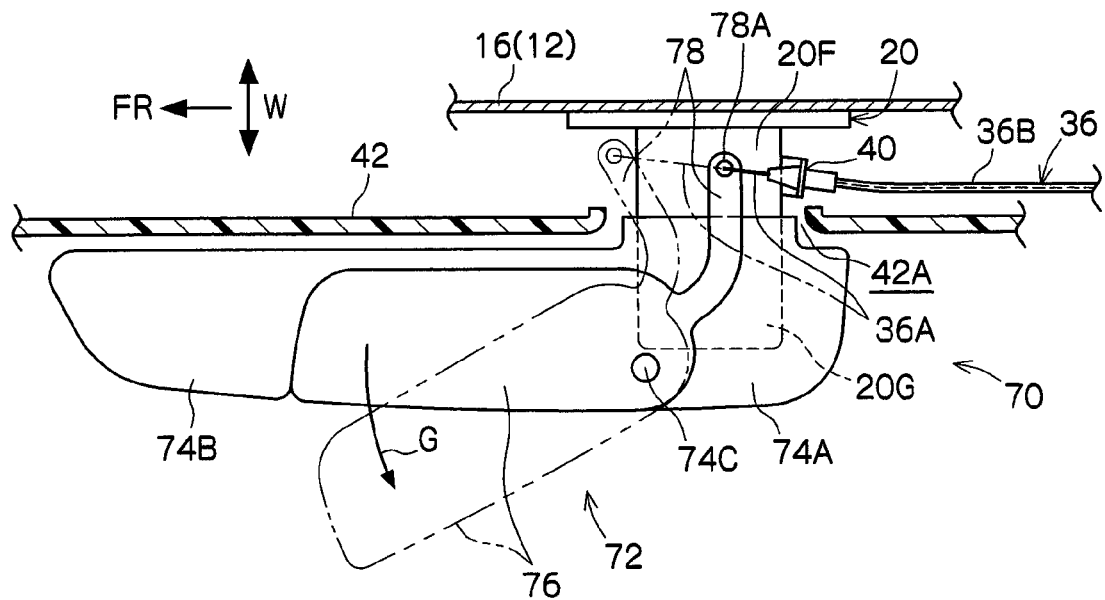
FIG. 9A is a plan view of a reclining operation state of an operation force imparting unit of a vehicle seat according to the fourth exemplary embodiment of the present invention.

As shown in the FIG. 9A, there is an arm 78 that protrudes out substantially in the width direction toward the inside from the rear end of the reclining lever 76. The arm 78 passes through a through hole 42A that is provided in the cover member 42, and the leading end 78A of the arm 78 is positioned between the seat cushion frame 16 and the cover member 42. One end of the cable 36A is anchored to the leading end 78A of the arm 78, the other end of the cable 36A being anchored to the lock release arm 20F (omitted in the figure). The covering 36B that covers the cable 36A, has one end fixed to the cable fixing bracket 38 (omitted in the figure) and the other end fixed to the cable fixing bracket 40. In this exemplary embodiment, the cable fixing bracket 40 is fixed to the operation load input portion 22G that is coaxial to the lifter knob 74 and that rotates at one therewith.

Other parts of the configuration of the vehicle seat 70 are the same as the corresponding parts of the configuration of the vehicle seat 10.

Figure 9B:
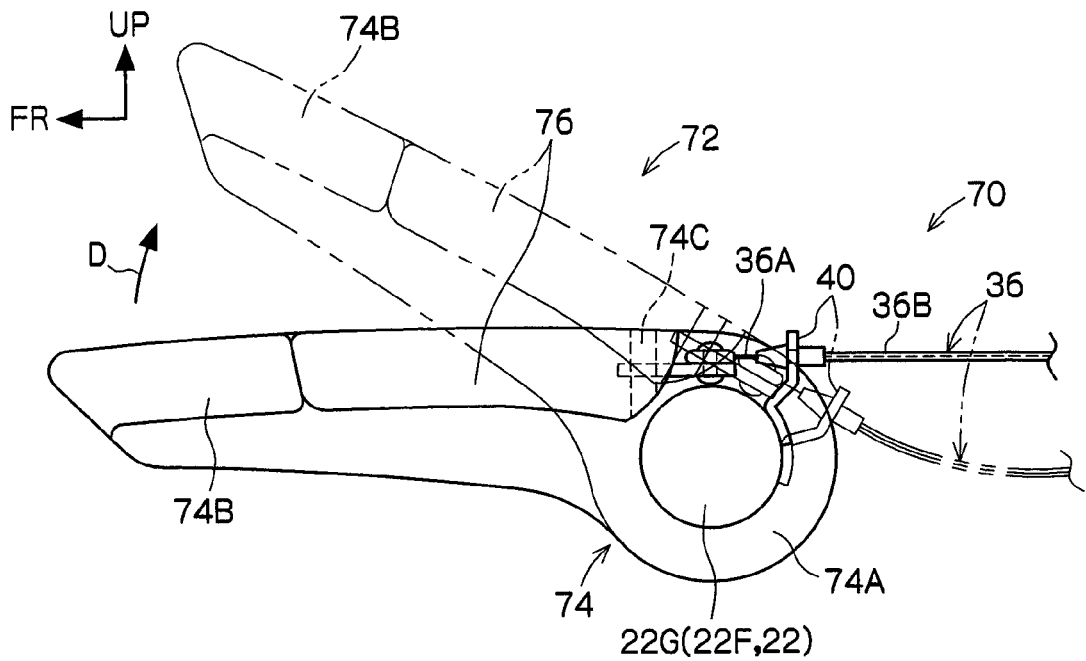
FIG. 9B is a side view of a seat lifter operation state of an operation force imparting unit of a vehicle seat according to the fourth exemplary embodiment of the present invention.

Therefore, seat height adjustment in the vehicle seat 70 is achieved in the same manner as that in the vehicle seat 10, by swinging operation of the lifter knob 74 between operation positions that are either up or down from a neutral position. Since the cable fixing bracket 40, which is fixed to the operation load input portion 22G, as shown in FIG. 9B, follows with respect to the swinging of the lifter knob 74, which has the reclining lever 76 retained relative thereto in the non-operation position, or in other words, since there is no change in the relative positions of the arm 78 and the cable fixing bracket 40, operation force of the lifter knob 74 is not transmitted to the seat lifter 22.

On the other hand, when a seat occupant is adjusting the angle of the seat back 14 relative to the seat cushion 12, the seat occupant holds the reclining lever 76 with the fingers and pulls out the reclining lever 76 from the non-operation position to the operation position (toward the outside in the width direction). When this occurs, the leading end 78A of the arm 78 is moved toward the front, and the cable 36A is relatively displace with respect to the covering 36B and rotates the lock release arm 20F to the arrow A side. By doing so, the lock of the reclining mechanism 20 is released. The seat occupant applies their body weight to the seat back 14 and tilts the seat back 14 backward and stops at the desired position, or stops the seat back 14, which is swinging up with the biasing force of the return spring, at the desired position. When the seat occupant releases the operation force from the reclining lever 76, the reclining mechanism 20 returns to the locked state by the biasing force of the torsion spring 20E, and the reclining lever 76 returns to the non-operation position.

Thereby, also in the vehicle seat 70, since in the common operation force imparting unit 72 there are provided the lifter knob 74 and the reclining lever 76 with different functions, similar operational effects may be obtained to those of the first exemplary embodiment. That is to say, in the vehicle seat 70, since when each of the reclining lever 76 and the lifter knob 74 are positioned in the non-operation position (neutral position) they are in a state of mutual overlap, the reclining lever 76 and the lifter knob 74 may both be disposed in positions that have good operability for a seat occupant. In particular, in the operation force imparting unit 72 configuring the vehicle seat 70, the reclining lever 76 in the non-operation position is configured to be contained in the lifter knob 74, and therefore a configuration may be realized in which both of these components are disposed in limited positions that have good operability for a seat occupant. That is to say, there is a limited range that provides good operability for a seat occupant, but in the present operation force imparting unit 72 the limitations to the arrangement and size of the reclining lever 76 and the lifter knob 74 are reduced, and an increase in the degrees of freedom for design is achieved.

Also, in the vehicle seat 70, since the reclining lever 76 is supported on the lifter knob 74 so as to be able to rotate around the support shaft 74C, or in other words, since the reclining lever 76 follows the operation of the lifter knob 74 while remaining in the non-operation position (supported state), the reclining lever 76 may be prevented from interfering with the movement of the lifter knob 74. However, since the cable fixing bracket 40 is fixed to the operation load input portion 22G that rotates as one with the lifter knob 74, or in other words, since the relative position (state) is constant between the reclining lever 76 and the cable fixing bracket 40 during the operation of the lifter knob 74, as described above, a configuration is realized in which the reclining lever 76 is supported by the lifter knob 74 and yet the operation force of the lifter knob 74 is not transmitted to the reclining mechanism 20.

Also here, in the vehicle seat 70, since the operation direction of the reclining lever 76 is different from the operation direction of the lifter knob 74, the operation force of the reclining lever 76 may be prevented from being transmitted to the seat lifter 22. That is to say, operation of an adjuster unintentionally by a vehicle occupant sitting in the seat may be prevented, and a good operation feel may be imparted to the seat occupant.

In this manner the vehicle seat 70 according to the fourth exemplary embodiment, there is good operability of the operation force imparting unit 72 that includes the reclining lever 76 and the lifter knob 74 for operating plural adjustable units.

Fifth Exemplary Embodiment

Figure 10:
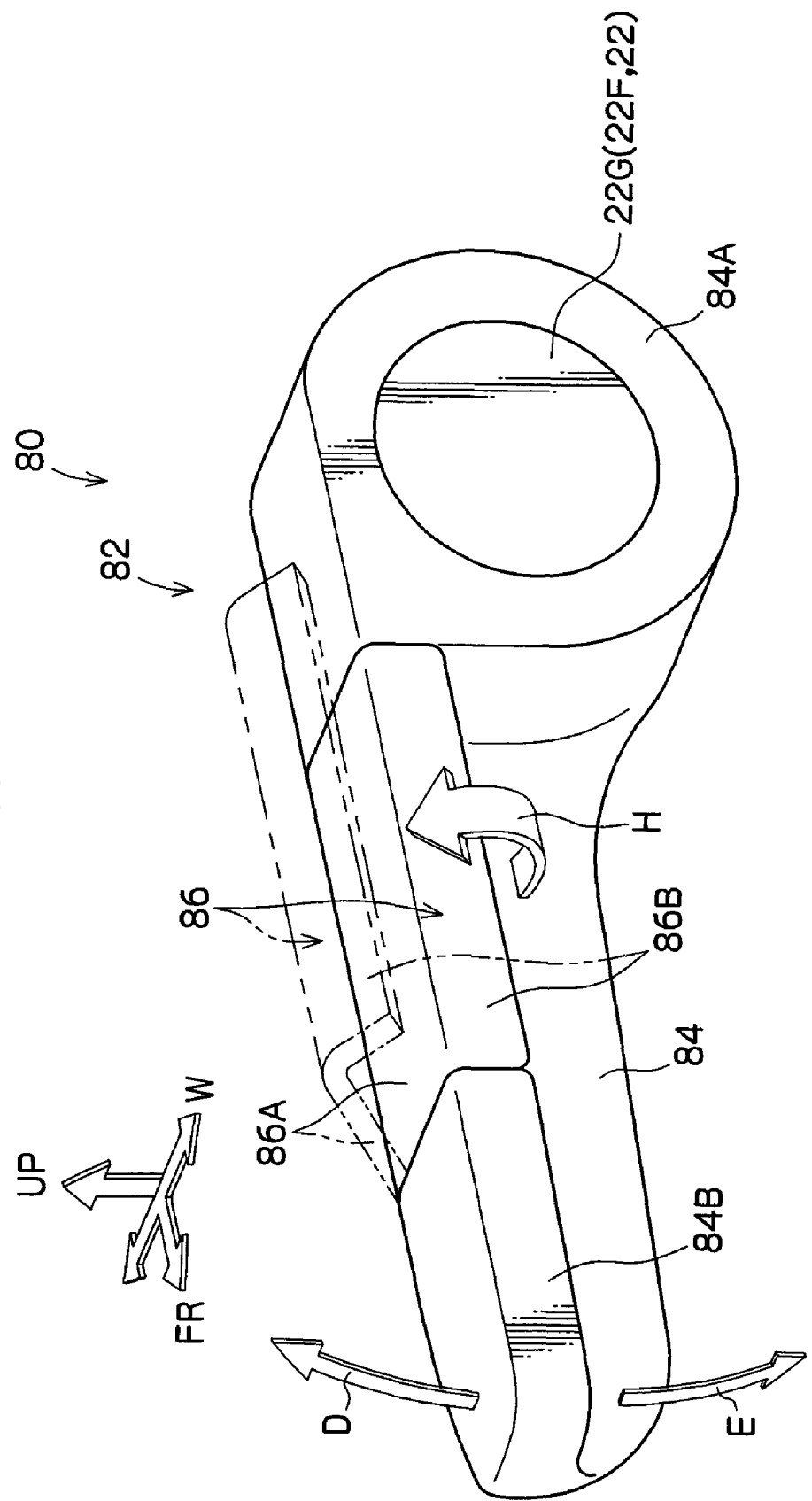
FIG. 10 is a perspective view of an operation force imparting unit of a vehicle seat according to a fifth exemplary embodiment of the present invention.

In FIG. 10 is shown a perspective view of an operation force imparting unit 82 configuring a vehicle seat 80 according to a fifth exemplary embodiment. This configuration is different from that of the vehicle seat 10 according to the first exemplary embodiment in that, as is shown in the figure, in the operation force imparting unit 82 there is a lifter knob 84 that rotates about an axis along the width direction and there is a reclining lever 86 that rotates about an axis in the front-rear direction, in place of the lifter knob 32 and the reclining lever 30 that each rotate about an axis in the width direction. Specific explanation thereof will now be given.

The lifter knob 84 is formed in a shape that is similar to that of the lifter knob 74, and a lifter connecting portion 84A is provided at the rear end side thereof extending out to the outside in the width direction, the lifter connecting portion 84A being connected and fixed to the operation load input portion 22G in the seat lifter 22 (pump lifter mechanism 22F) so as to rotate coaxially and at one therewith. Furthermore, there is a handle portion 84B protruding out to the outside in the width direction from a front end portion of the lifter knob 84. Thereby, the lifter knob 84 is operated from the neutral position to the upper operation position by a seat occupant of the vehicle seat 80 holding the lower face of the handle portion 84B with their fingers and pulling up, and the seat occupant operates the lifter knob 84 from the neutral position to the lower operation position by pushing the upper surface of the handle portion 84B down using the palm of their hand.

Figure 11A:
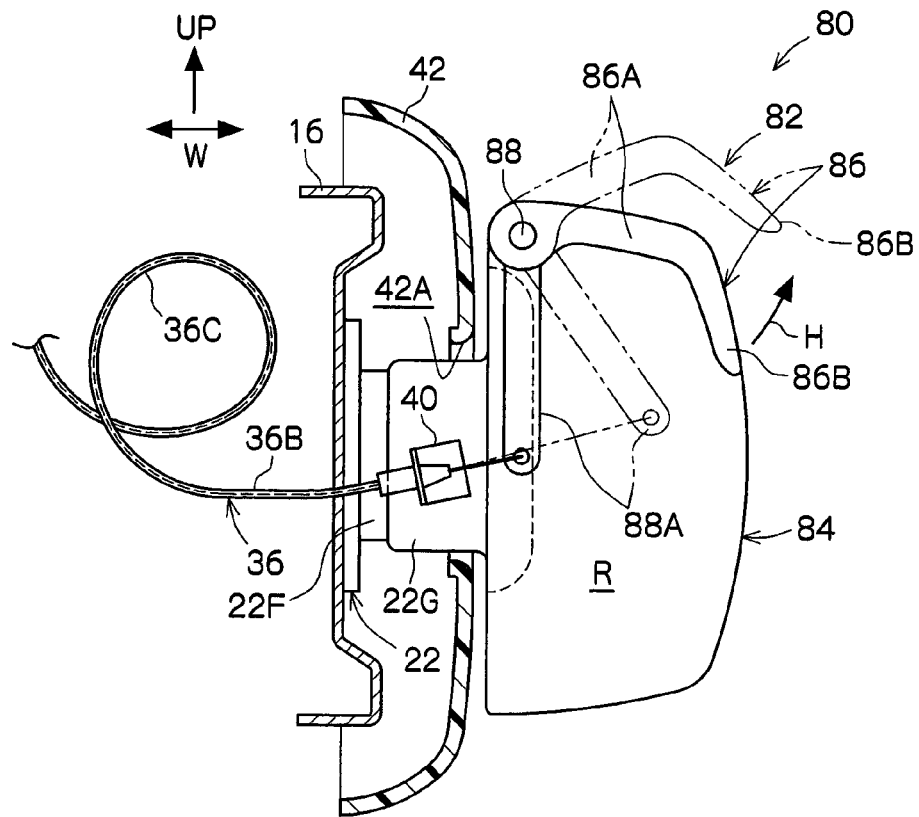
FIG. 11A is a front view of a reclining operation state of an operation force imparting unit of a vehicle seat according to the fifth exemplary embodiment of the present invention.

The reclining lever 86, as with the reclining lever 30 relative to the lifter knob 32, in the non-operation position is disposed between the lifter connecting portion 84A and the handle portion 84B in plan view, and the top edge of the reclining lever 86 is positioned so as to follow along the top edge of the lifter knob 84 in side view. Therefore, the reclining lever 86 in the state of being positioned in the non-operation position is configured so as to be contained in the lifter knob 84. As shown in FIG. 11A, the reclining lever 86 in the non-operation position has a top wall 86A that is positioned contiguous to the rear of the handle portion 84B, and an outer wall 86B that hangs down from the outside edge in the width direction of the top wall 86A, thereby forming an L-shape when viewed from the front.

There is a support shaft member 88 provided at an inside portion in the width direction of the top wall 86A in the reclining lever 86, with the axis of the support shaft member 88 being along the front-rear direction that the support shaft member is able to rotate as one with the reclining lever 86. Each of the end portions of the support shaft member 88, extending out to the front and rear from the reclining lever 86, are supported by, respectively, the lifter connecting portion 84A and by the handle portion 84B, so as to be able to rotate. The reclining lever 86 is configured so as to be able to take up an operation position, by rotation about the support shaft member 88 in the direction of arrow H, the operation position being with the top wall 86A angled toward the inside in the width direction, as shown by the two-dot chain lines in FIG. 10 with respect to the non-operation position shown by the solid lines therein.

Figure 11B:
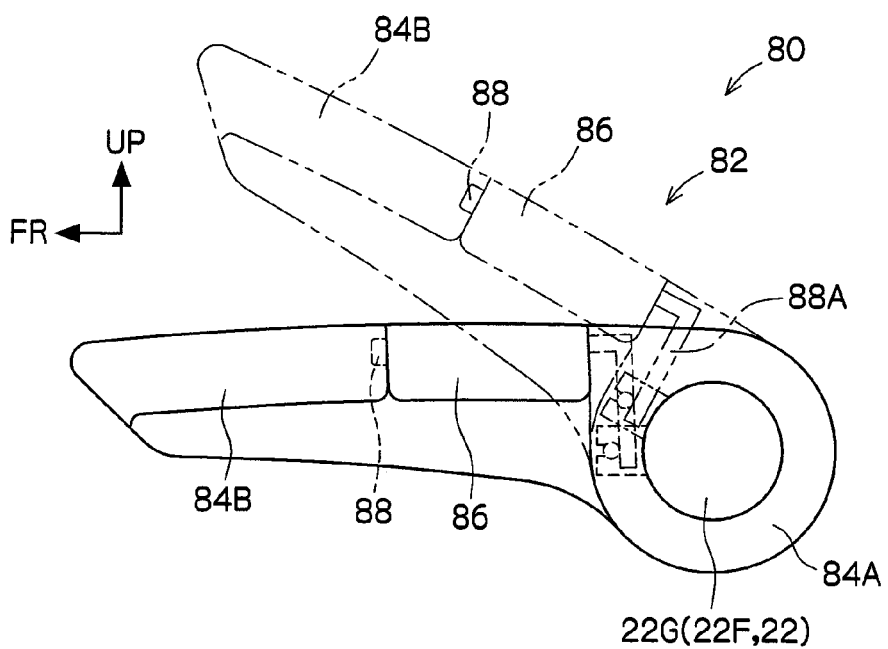
FIG. 11B is a side view of a seat lifter operation state of an operation force imparting unit of a vehicle seat according to the fifth exemplary embodiment of the present invention.

As shown in FIG. 1A, the rear end of the support shaft member 88 is provided with an arm 88A that is incorporated in the space R that is formed between the lock release arm 20F and the lifter connecting portion 84A, and that hangs down from the rear end thereof so as to be able to rotate at one therewith (see FIG. 11B). The bottom end of the arm 88A is anchored to one end of the cable 36A, the other end of the cable 36A being anchored to the lock release arm 20F. One end of the covering 36B covering the cable 36A is fixed to the cable fixing bracket 38 (omitted in the figure), and the other end of the covering 36B is fixed to the cable fixing bracket 40. In this exemplary embodiment, the cable fixing bracket 40 is fixed to the operation load input portion 22G that rotates coaxially and as one with the lifter knob 84.

Other parts of the configuration of the vehicle seat 80 are the same as the corresponding parts of the vehicle seat 10.

Therefore, seat height adjustment in the vehicle seat 80 is achieved in the same manner as that in the vehicle seat 10, by swinging operation of the lifter knob 84 between operation positions that are either up or down from a neutral position. Since the cable fixing bracket 40, which is fixed to the operation load input portion 22G, follows with respect to the swinging of the lifter knob 84, which has the reclining lever 86 retained in the non-operation position relative thereto, or in other words, since there is no change in the relative positions of the arm 88A and the cable fixing bracket 40, operation force of the lifter knob 84 is not transmitted to the seat lifter 22.

On the other hand, when a seat occupant is adjusting the angle of the seat back 14 relative to the seat cushion 12, the seat occupant holds the outer wall 86B of the reclining lever 86 with their fingers and pulls up the reclining lever 86 from the non-operation position to the operation position. Then, the bottom end of the arm 88 is moved to the outside in the width direction, and the cable 36A relatively displaces the lock release arm 20F with respect to the covering 36B and rotates the lock release arm 20F to the arrow A side. By doing so, the lock of the reclining mechanism 20 is released. The seat occupant applies their body weight to the seat back 14 and tilts the seat back 14 backward and stops at the desired position, or stops the seat back 14, which is swinging up with the biasing force of the return spring, at the desired position. When the seat occupant releases the operation force from the reclining lever 86, the reclining mechanism 20 returns to the locked state by the biasing force of the torsion spring 20E, and the reclining lever 86 returns to the non-operation position.

Thereby, also in the vehicle seat 80, since in the common operation force imparting unit 82 there are provided the lifter knob 84 and the reclining lever 86 with different functions, similar operational effects may be obtained to those of the first exemplary embodiment. That is to say, in the vehicle seat 80, since when each of the reclining lever 86 and the lifter knob 84 are positioned in their respective non-operation positions (neutral positions) they are in a state of mutual overlap, the reclining lever 86 and the lifter knob 84 may both be disposed in positions that have good operability for a seat occupant. In particular, in the operation force imparting unit 82 configuring the vehicle seat 80, the reclining lever 86 in the non-operation position is configured to be contained in the lifter knob 84, and therefore a configuration may be realized in which both of these components are disposed in limited positions that have good operability for a seat occupant. That is to say, there is a limited range that provides good operability for a seat occupant, but in the present operation force imparting unit 82 the limitations to the arrangement and size of the reclining lever 86 and the lifter knob 84 are reduced, and an increase in the degrees of freedom for design is achieved.

Also, in the vehicle seat 80, since the reclining lever 86 is supported on the lifter knob 84 so as to be able to rotate around the support shaft 88, or in other words, since the reclining lever 86 follows the operation of the lifter knob 84 while remaining in the non-operation position (supported state), the reclining lever 86 may be prevented from interfering with the movement of the lifter knob 84. However, since the cable fixing bracket 40 is fixed to the operation load input portion 22G that rotates as one with the lifter knob 84, or in other words, since the relative position (state) is constant between the reclining lever 86 and the cable fixing bracket 40 during the operation of the lifter knob 84, as described above, a configuration is realized in which the reclining lever 86 is supported by the lifter knob 84 and yet the operation force of the lifter knob 84 is not transmitted to the reclining mechanism 20.

Also here, in the vehicle seat 80, since the direction of imparting the operation force to the cable 36A of the reclining lever 86 is different from the operation direction of the lifter knob 84, the operation force of the reclining lever 86 may be prevented from being transmitted to the seat lifter 22. That is to say, operation of an adjuster unintentionally by a vehicle occupant sitting in the seat may be prevented, and a good operation feel may be imparted to the seat occupant.

In this manner the vehicle seat 80 according to the fifth exemplary embodiment, there is good operability of the operation force imparting unit 82 that includes the reclining lever 86 and the lifter knob 84 for operating plural adjustable units.

Sixth Exemplary Embodiment

Figure 15:
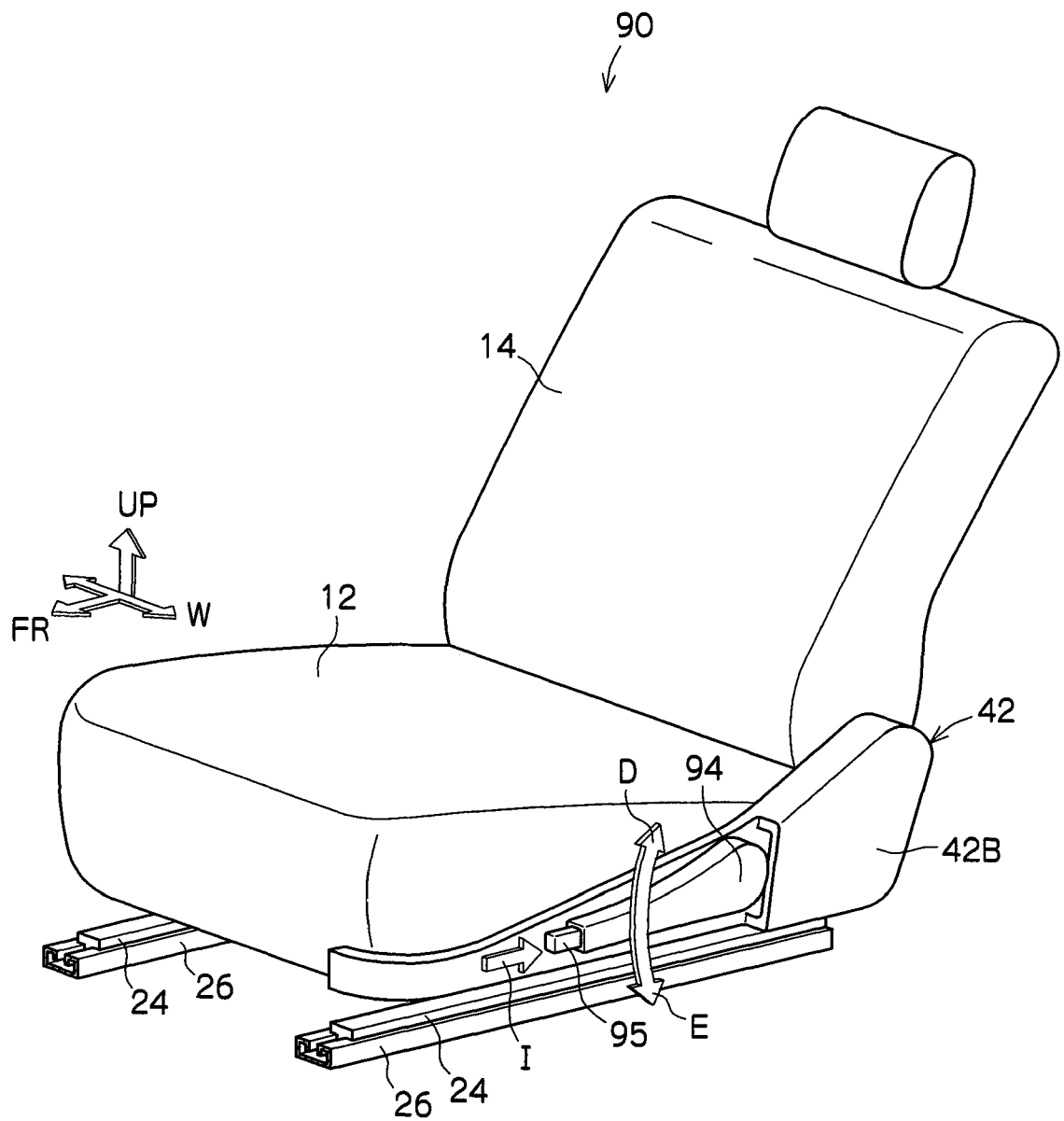
FIG. 15 is a perspective view showing an overall configuration of a vehicle seat according to the sixth exemplary embodiment of the present invention.

In FIG. 15 is shown a perspective view of a vehicle seat 90 according to a sixth exemplary embodiment. This configuration is different from that of each of the above exemplary embodiments in that an operation force imparting unit 92 configuring the vehicle seat 90 is provided with, as shown in the figure, a reclining knob 95 that is operated along a straight line with respect to a lifter knob 94, in place of the rotational operation reclining levers 30, 76, 86, respectively.

Figure 14:
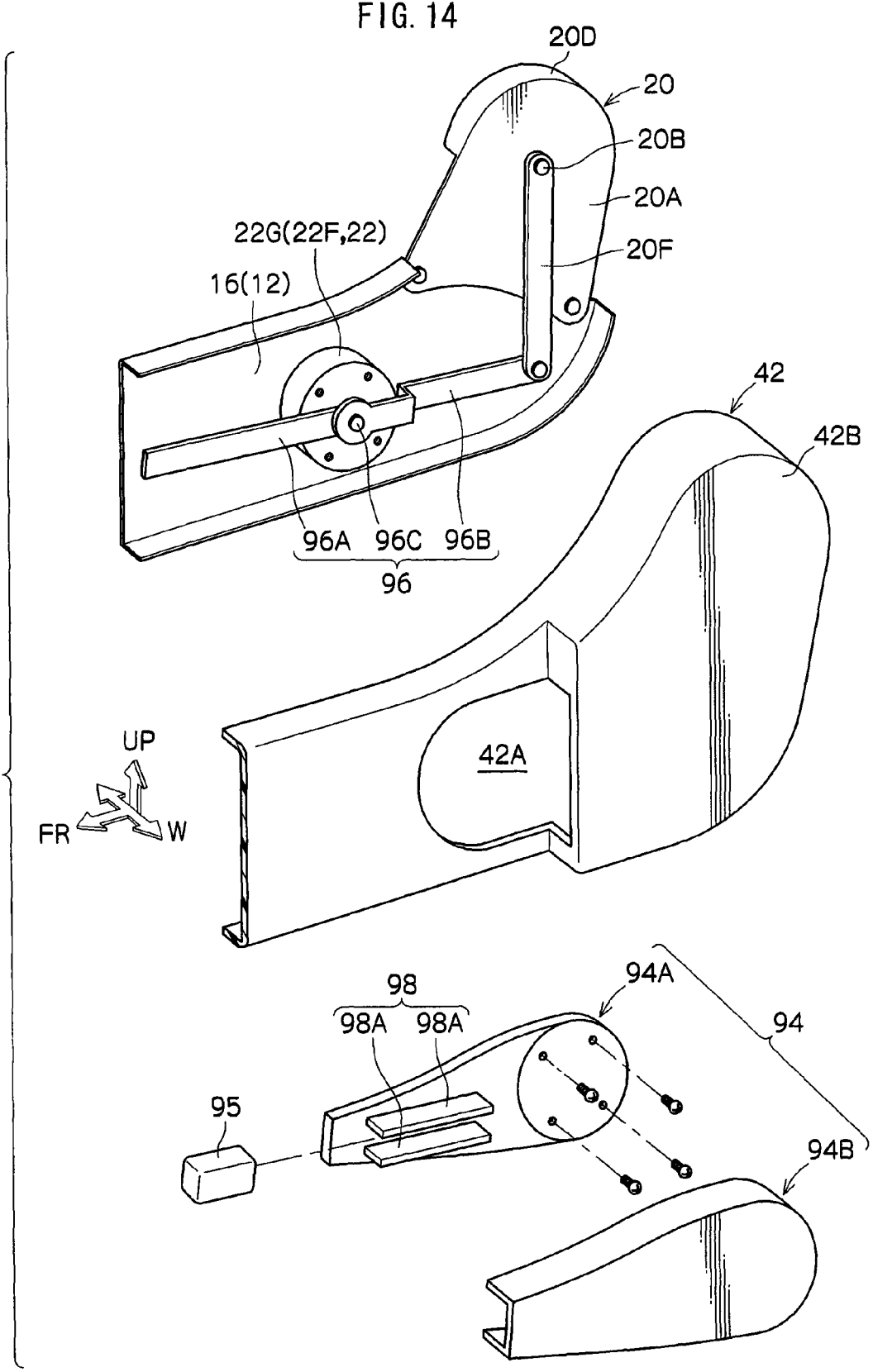
FIG. 14 is an exploded perspective view of an operation force imparting unit of a vehicle seat according to the sixth exemplary embodiment of the present invention.

As is shown in the exploded perspective view of FIG. 14, the lifter knob 94 is configured including a knob body 94A that is connected to the pump lifter mechanism 22F, and a knob cover 94B that covers the knob body 94A from the width direction outside. The knob body 94A is long in the front-rear direction, and the lifter connecting portion is provided to the rear end thereof, and is fixed and connected coaxially with the operation load input portion 22G of the seat lifter 22 (pump lifter mechanism 22F) so as to rotate as one therewith. By doing so, in the same way as with the above described lifter knob 32 and the like, height adjustment of the vehicle seat 90 is configured so as to be carried out by swinging operation of the lifter knob 94 either up or down from the neutral position thereof.

In the lifter knob 94, the knob cover 94B covers the knob body 94A and there is a space formed in an internal portion thereof that is open to the front. Also, the reclining knob 95 is formed in a block shape, and the reclining knob 95 is fitted into the open end of the lifter knob 94 so as to be able to slide along the front-rear direction (being guided). In this exemplary embodiment, the release of the reclining lock is carried out by pushing in the reclining knob 95, backwards (toward the inside of the lifter knob 94) in the direction indicated by arrow I. It is configured such that the operation force from this pushing-in is transmitted, through a linkage 96, to the pump lifter mechanism 22F of the seat lifter 22.

Figure 12:
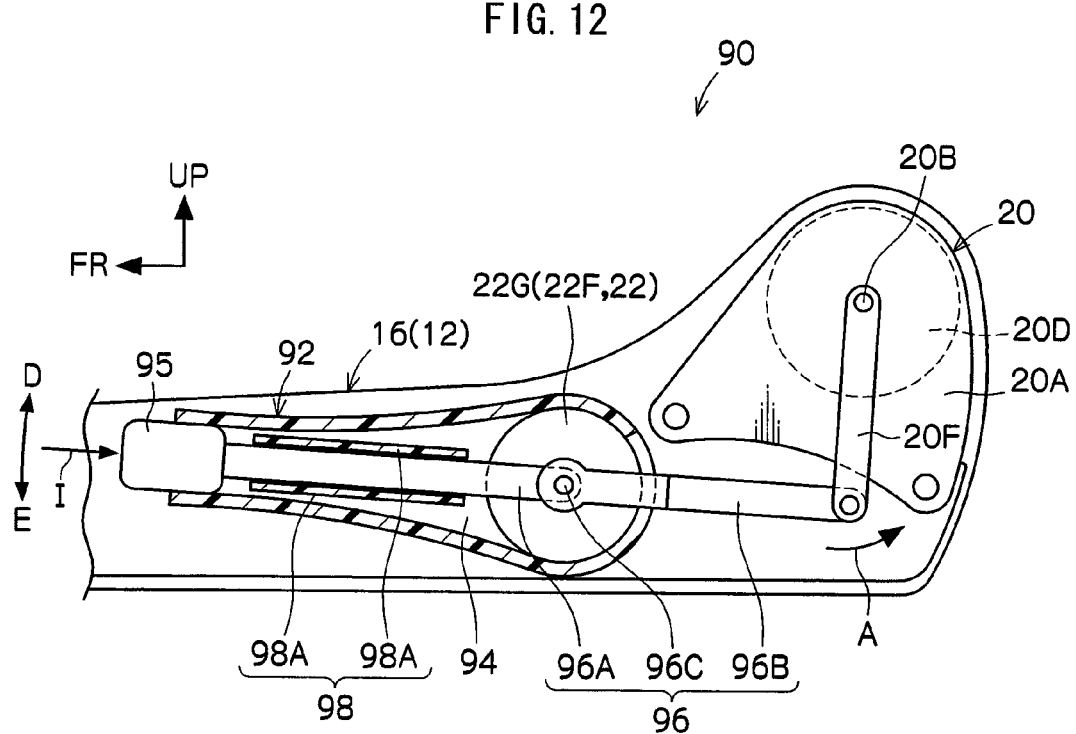
FIG. 12 is a side view of an operation force imparting unit of a vehicle seat according to a sixth exemplary embodiment of the present invention.

As is shown in FIG. 12, the linkage 96 includes main components of: a front link 96A, the front end of the front link 96A being fixed to the reclining knob 95; a rear link 96B, the rear end of the rear link 96B being connected to the lock release arm 20F such that the relative angle therebetween may be changed; and a link pin 96C, connected to the rear end of the front link 96A and the front end of the rear link 96B so as to be able give relative angular displacement around an axis that is along the width direction. The linkage 96 passes through the space inside the lifter knob 94 in the front-rear direction.

The front half portion of reclining knob 95, when is positioned in a non-operation position by the biasing force of a torsion spring 20E, protrudes out from the lifter knob 94. The operation force imparting unit 92 is configured so that, in this non-operation position, the axial direction of the link pin 96C matches the rotational axis of the lifter knob 94 (is positioned on an extension of the axis). Thereby, as shown in FIG. 13B, when the reclining knob 95 is positioned in the non-operation position, the lifter knob 94 is able to undertake smooth rotational operation. It should be noted that the reclining knob 95 is engaged to a non illustrated stopper, and the reclining knob 95 is prevented from protruding more than a predetermined amount from the lifter knob 94 and retained in the non-operation position.

Figure 13A:
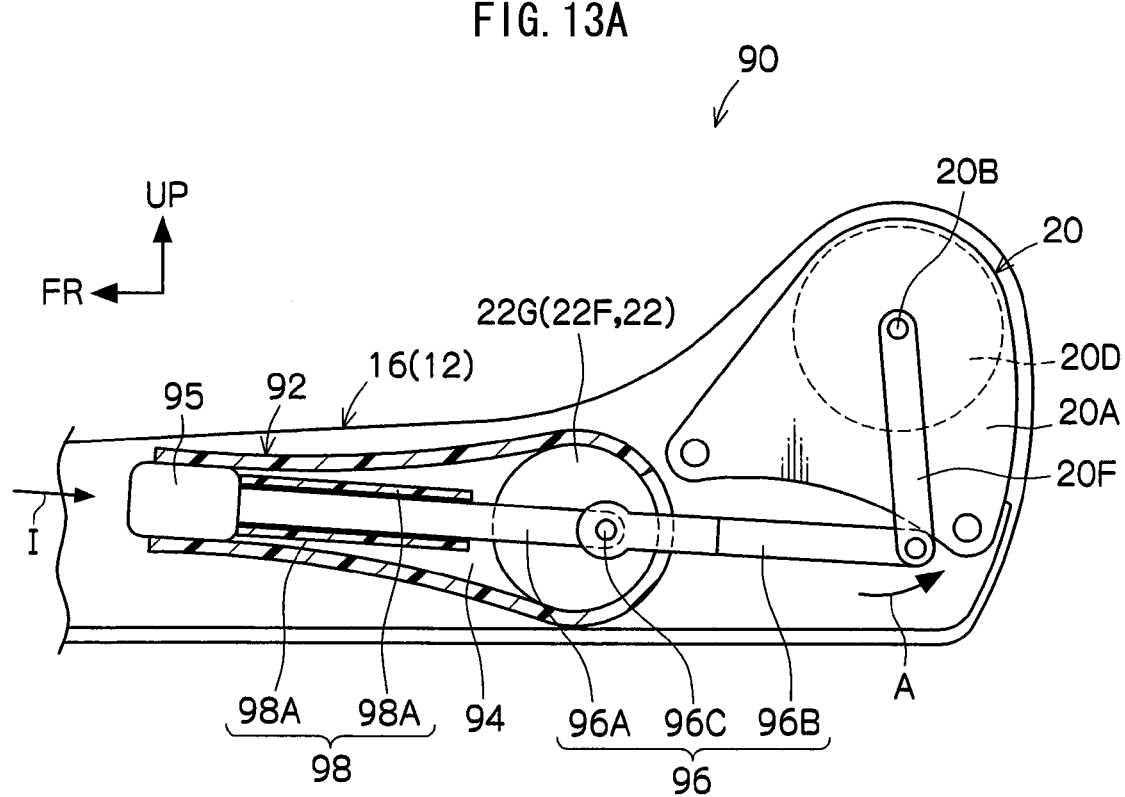
FIG. 13A is a side view of a reclining operation state of an operation force imparting unit of a vehicle seat according to the sixth exemplary embodiment of the present invention.
Figure 13B:
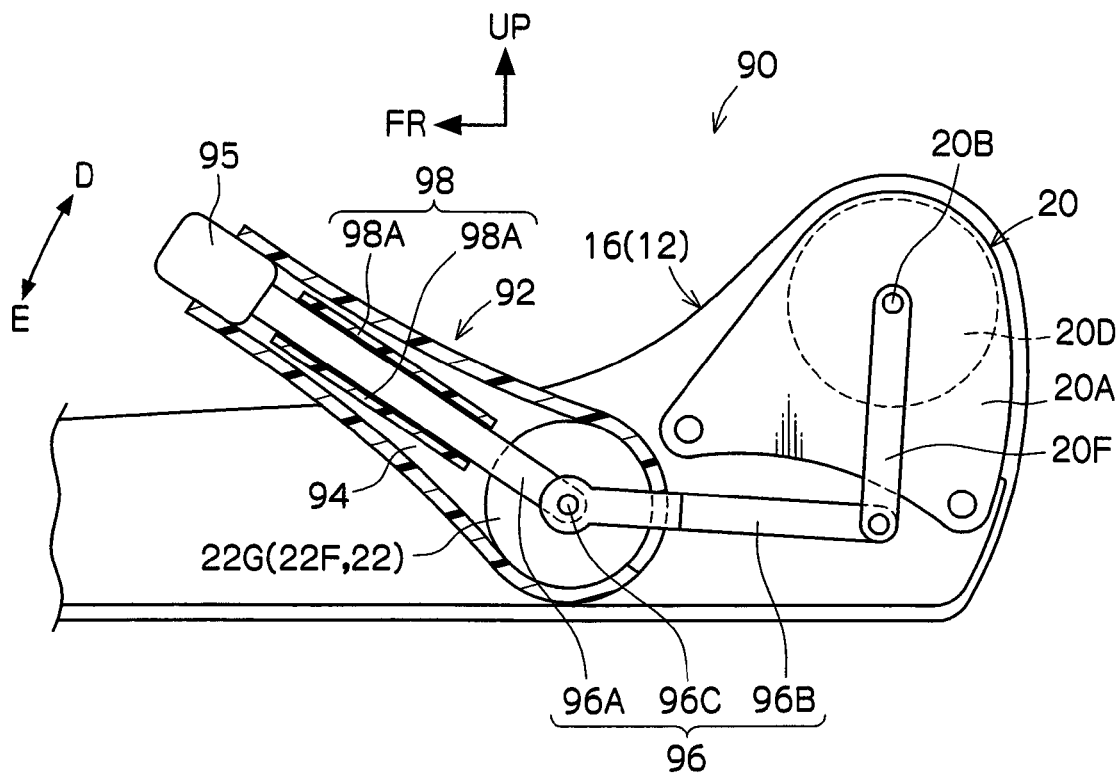
FIG. 13B is a side view of a seat lifter operation state of an operation force imparting unit of a vehicle seat according to the sixth exemplary embodiment of the present invention.

On the other hand, in the operation force imparting unit 92, as shown in FIG. 13A, when the reclining knob 95 is pushed backwards, in from the non-operation position, that is to say, pushed into the operation position, the operation force is transmitted to the lock release arm 20F mainly as compressive force of the linkage 96, so as to rotate the lock release arm 20F in the direction of the arrow A. It should be noted that in this exemplary embodiment in which the operation force is transmitted by the compressive load of the linkage 96, the direction of the arrow A, which is the lock release direction, is opposite to that in the respective exemplary embodiment in which the operation force is transmitted by the pulling of the cable.

The operation force imparting unit 92 is also provided with a link guide 98 for restricting the displacement direction of the linkage 96 that accompanies the pushing in operation of the reclining knob 95. In this exemplary embodiment, the link guide 98, as shown in FIG. 14, is configured from a pair of, upper and lower, guide walls 98A that have their lengths along the front-rear direction and protrude out from the knob body 94A. By the front link 96A being inserted between the guide walls 98A, the displacement direction of the front link 96A is restricted to the front-rear direction. It is configured, thereby, such that there is no relative angular displacement (bending at the link pin 96C) generated between the front link 96A and the rear link 96B. The knob body 94A is made from a resin material, and the link guide 98 is formed integrally thereto.

Other parts of the configuration of the vehicle seat 90 are the same as the corresponding parts of the vehicle seat 10, excluding the different shape of the cover member 42.

Therefore, seat height adjustment in the vehicle seat 90 is achieved in the same manner as that in the vehicle seat 10, by swinging operation of the lifter knob 94 between operation positions that are either up or down from a neutral position. Since the front link 96A of the linkage 96, as shown in FIG. 13B, rotates around the link pin 96C with respect to the rear link 96B accompanying the swinging of the lifter knob 94, which has the reclining knob 95 retained relative thereto in the non-operation position, or in other words, since the front link 96A rotates coaxially with the lifter knob 94 and follows the lifter knob 94, the operation of the lifter knob 94 is not impeded by the lifter knob 94 (reclining operation system).

On the other hand, when a seat occupant is adjusting the angle of the seat back 14 relative to the seat cushion 12, the seat occupant presses the reclining knob 95 backward and pushes in the reclining knob 95 toward the inside of the lifter knob 94. Then, the linkage 96, including the front link 96A that is guided by the link guide 98, pushes the lock release arm 20F backward in a straight line, and the lock release arm 20F rotates to the arrow A side. By doing so, the lock of the reclining mechanism 20 is released. The seat occupant applies their body weight to the seat back 14 and tilts the seat back 14 backward and stops at the desired position, or stops the seat back 14, which is swinging up with the biasing force of the return spring, at the desired position. When the seat occupant releases the operation force from the reclining knob 95, the reclining mechanism 20 returns to the locked state by the biasing force of the torsion spring 20E, and the reclining knob 95 returns to the non-operation position.

Thereby, also in the vehicle seat 90, since in the common operation force imparting unit 92 there are provided the lifter knob 94 and the reclining knob 95 with different functions, similar operational effects may be obtained to those of the first exemplary embodiment. That is to say, in the vehicle seat 90, since when each of the reclining knob 95 and the lifter knob 94 are positioned in the non-operation position (neutral position) they are in a state of mutual overlap, the reclining knob 95 and the lifter knob 94 may both be disposed in positions that have good operability for a seat occupant. In particular, in the operation force imparting unit 92 configuring the vehicle seat 90, the reclining knob 95 positioned in the non-operation position is configured to be contained in the lifter knob 94 with an operable portion protruding therefrom, and therefore a configuration may be realized in which both of these components are disposed in the limited positions that have good operability for a seat occupant. That is to say, there is a limited range that provides good operability for a seat occupant, but in the present operation force imparting unit 92 the limitations to the arrangement and size of the reclining knob 95 and the lifter knob 94 are reduced, and an increase in the degrees of freedom for design is achieved. However, since in this exemplary embodiment the operation space of the reclining knob 95 is set to be within the lifter knob 94, there are less restrictions when other operational components are provided.

Also, in the vehicle seat 90, since the reclining knob 95 is supported on the lifter knob 94 so as to be able to slide in the front-rear direction, or in other words, since the reclining knob 95 follows the operation of the lifter knob 94 while remaining in the non-operation position (supported state), the reclining knob 95 may be prevented from interfering with the movement of the lifter knob 94. However, since in the state in which the reclining knob 95 is positioned in the non-operation position the link pin 96C of the linkage 96 is on the rotational axis of the lifter knob 94, a configuration is realized in which the reclining knob 95 is disposed with good operability on the opposite side of the seat lifter 22 (rotational axis of the lifter knob 94) to that of the reclining mechanism 20. Adjustment of the reclining occurring while the seat height is being adjusted is prevented in this configuration by the bending of the linkage 96, and furthermore, since the linkage 96 is disposed to pass through the rotational axis of the lifter knob 94, any moment trying to rotate the lifter knob 94 that is generated when the reclining knob 95 is operated, due to friction acting on the internal faces of the lifter knob 94 and the link guide 98, is made extremely small, and seat height adjustment occurring during reclining adjustment may be prevented.

Also here, in the vehicle seat 90, since the direction of operation of the reclining knob 95 is different from the operation direction of the lifter knob 94, the operation force of the reclining knob 95 may be prevented from being transmitted to the seat lifter 22, and the operation force of the lifter knob 94 may be prevented from being transmitted to the reclining mechanism 20. That is to say, operation of an unintended adjuster by a vehicle occupant sitting in the seat may be prevented, and a good operation feel may be imparted to the seat occupant.

Furthermore, since the operation force imparting unit 92 is provided with the link guide 98, the operation force that is imparted to the reclining knob 95 may be transmitted efficiently to the lock release arm 20F without the linkage 96 undertaking relative angular displacement (bending). Also, the transmission of operation force to the reclining mechanism 20 by mistaken operation of the reclining knob 95, during the above described operation of the lifter knob 94, may be reliably prevented by the link guide 98. Also, since the link guide 98 is provided integrally to the knob body 94A, a resin component, an increase in the number of components may be avoided and the construction may be simplified.

In this manner the vehicle seat 90 according to the sixth exemplary embodiment, there is good operability of the operation force imparting unit 92 that includes the reclining knob 95 and the lifter knob 94 for operating plural adjustable units.

Seventh Exemplary Embodiment

Figure 16:
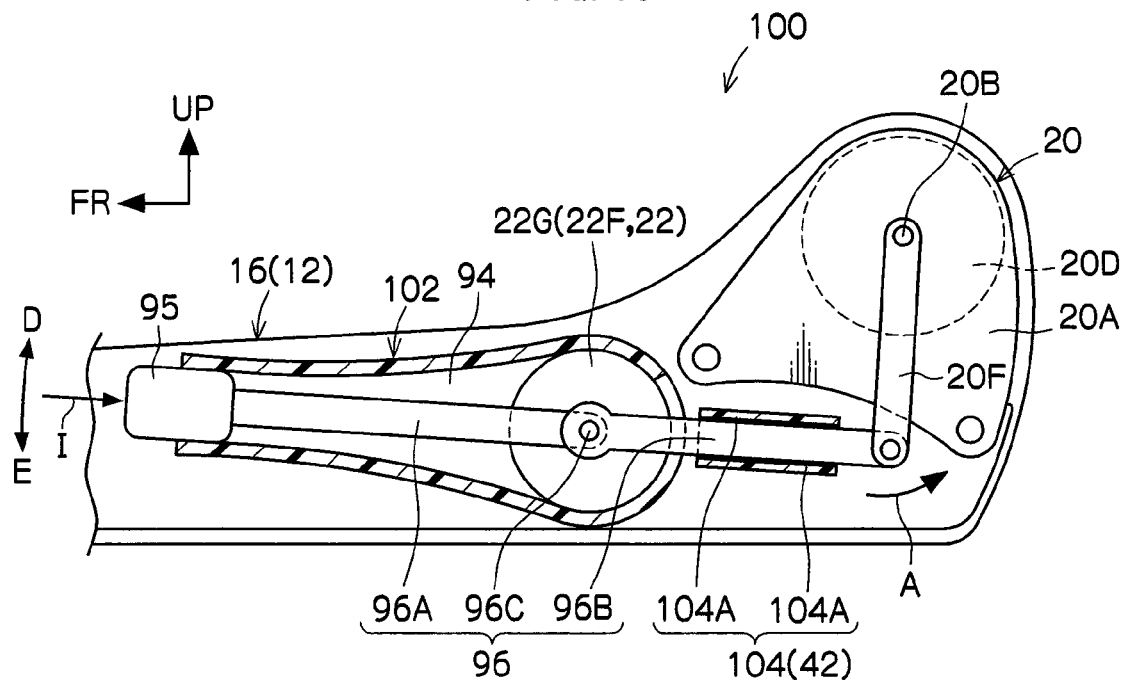
FIG. 16 is a side view of an operation force imparting unit of a vehicle seat according to a seventh exemplary embodiment of the present invention.

In FIG. 16 is shown an operation force imparting unit 102 configuring a vehicle seat 100 according to a seventh exemplary embodiment, in side view. This configuration is different from that of the sixth exemplary embodiment in that the operation force imparting unit 102 is provided with a link guide 104 provided on the seat cushion frame 16 side, in place of the link guide 98 provided on the lifter knob 94.

The link guide 104 is configured from a pair of, upper and lower, guide walls 104A that have their lengths along the front-rear direction and extend to the inside in the width direction from the inner face of a rear portion 42B of the cover member 42 that is fixed and mounted to the seat cushion frame 16. The link guide 104 has the rear link 96B inserted between the pair of, upper and lower, guide walls 104A, and this restricts the displacement direction of the rear link 96B to the front-rear direction. It is configured, thereby, such that in the linkage 96 there is no relative angular displacement between the front link 96A and the rear link 96B (bending at the link pin 96C) generated by the operation of pushing-in the reclining knob 95. The cover member 42 is made from a resin material, and the link guide 104 is formed integrally thereto.

Other parts of the configuration of the vehicle seat 100 are the same as the corresponding parts of the vehicle seat 90. It should be noted that the link guide 104 may be provided to the seat cushion frame 16.

Thereby, also in the vehicle seat 100 according to the seventh exemplary embodiment, similar operational effects may be obtained to those by operation of the vehicle seat 90 according to the sixth exemplary embodiment. Also, since the link guide 104 is provided integrally to the cover member 42, a resin component, there is no increase in the number of components and the structure may be simplified.

Eighth Exemplary Embodiment

Figure 17:
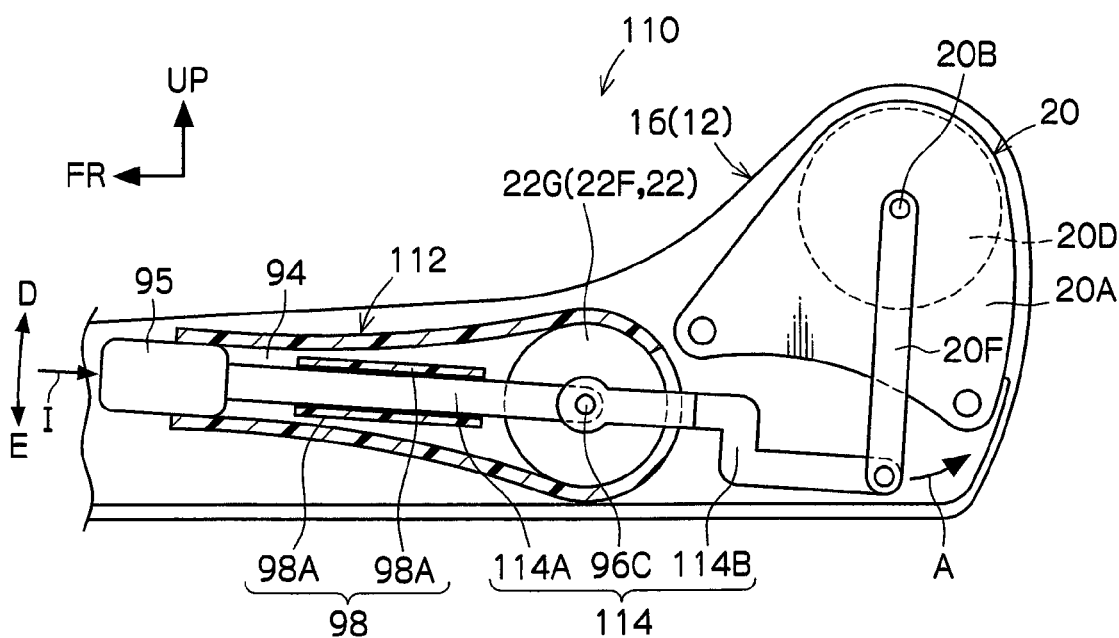
FIG. 17 is a side view of an operation force imparting unit of a vehicle seat according to an eighth exemplary embodiment of the present invention.

In FIG. 17 is shown a side view of an operation force imparting unit 112 configuring a vehicle seat 110 according to an eighth exemplary embodiment. As may be seen from the figure, this configuration is different from that of the sixth exemplary embodiment in that the operation force imparting unit 112 is provided with linkage 114, in place of the linkage 96 that forms a straight line and transmits the operation force mainly as a compressive load.

The linkage 114 is configured with main components of: a front link 114A that is configured similar to the front link 96A; a rear link 114B; and a link pin 96C that connects together the front link 114A and the rear link 114B. The rear link 114B is formed into a crank shape, with a bend in an intermediate portion thereof, in the length direction along the front-rear direction, and the front portion thereof positioned higher than the rear portion. Due to this, the lock release arm 20F that is connected to the rear end of the rear link 114B is formed longer than the lock release arm 20F of the sixth and seventh exemplary embodiments. Namely, the linkage 114 is configured such that the rear end thereof, which is the load output portion, is lower than the front end thereof, which is the load input portion. Other parts of the configuration of the vehicle seat 110 are the same as the corresponding parts of the vehicle seat 90.

Therefore, also in the vehicle seat 110 according to the eighth exemplary embodiment, similar operational effects may be obtained to those by operation of the vehicle seat 90 according to the sixth exemplary embodiment. Also, since the rear link 114B of the linkage 114 is formed in a crank shape, or in other words, since in the moment arm of the lock release moment based on the operation force inputted to the lock release arm 20F is set long, the reclining lock may be released with a small operation force.

Ninth Exemplary Embodiment

Figure 18:
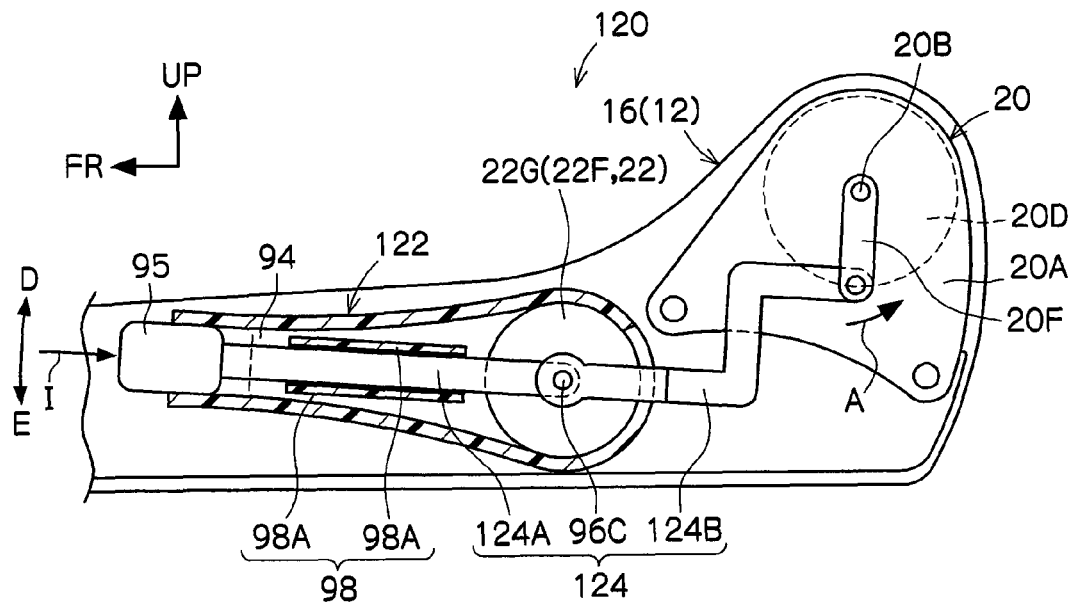
FIG. 18 is a side view of an operation force imparting unit of a vehicle seat according to a ninth exemplary embodiment of the present invention.

In FIG. 18 is shown a side view of an operation force imparting unit 122 configuring a vehicle seat 120 according to a ninth exemplary embodiment. This configuration is different from that of the sixth exemplary embodiment in that, as shown in the figure, the operation force imparting unit 122 is provided with a linkage 124 in place of the linkage 96 that is formed into a straight line and transmits the operation force mainly as a compressive force.

The linkage 124 is configured with main components of: a front link 124A that is configured similar to the front link 96A; a rear link 124B; and a link pin 96C that connects together the front link 124A and the rear link 124B. The rear link 124B is formed into a crank shape, with a bend in an intermediate portion thereof, in the length direction along the front-rear direction, and the front portion thereof positioned lower than the rear portion. Due to this, the lock release arm 20F that is connected to the rear end of the rear link 124B is formed shorter than the lock release arm 20F of the sixth and seventh exemplary embodiments. Namely, the linkage 124 is configured such that the rear end thereof, which is the load output portion, is higher than the front end thereof, which is the load input portion. Other parts of the configuration of the vehicle seat 120 are the same as the corresponding parts of the vehicle seat 90.

Therefore, also in the vehicle seat 120 according to the ninth exemplary embodiment, similar operational effects may be obtained to those by operation of the vehicle seat 90 according to the sixth exemplary embodiment. Also, since the rear link 124B of the link guide 124 is formed in a crank shape, or in other words, since in the locking release moment based on the operation force, the input force to the lock release arm 20F of the locking release, the moment arm is set short and the reclining lock may be released with a small operation stroke.

Tenth Exemplary Embodiment

Figure 19:
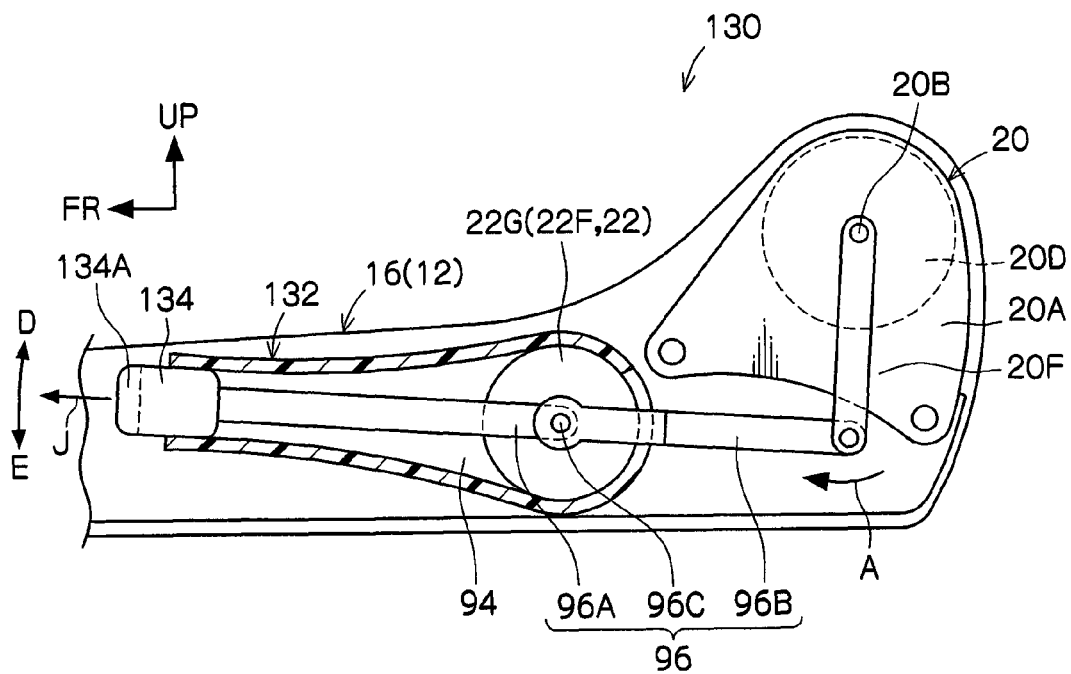
FIG. 19 is a side view of an operation force imparting unit of a vehicle seat according to a tenth exemplary embodiment of the present invention.

In FIG. 19 is shown a side view of an operation force imparting unit 132 configuring a vehicle seat 130 according to a tenth exemplary embodiment. This configuration is different from that of the sixth exemplary embodiment in that, as shown in the figure, the operation force imparting unit 132 is provided with a reclining knob 134 that releases the reclining locking by being pulled out from inside of the lifter knob 94, in place of the reclining knob 95 for releasing the reclining locking by being pushed into the lifter knob 94.

There is a grip portion 134A formed, for gripping with the fingers, to a portion of the reclining knob 134 that protrudes to the outside of the lifter knob 94, and a seat occupant grips the grip portion 134A with their fingers and pulls out the reclining knob 134 to the front as indicated with the arrow J. The reclining knob 134 and the lock release arm 20F are connected together though the linkage 96. Thus, the locking release direction (direction of arrow A) of the reclining mechanism 20 according to this exemplary embodiment is the reverse to that of the sixth to the ninth exemplary embodiments.

Also, in the state in which the reclining knob 134 is positioned in the non-operation position, the link pin 96C of the linkage 96 exactly matches the axis of rotation of the lifter knob 94. It should be noted that the reclining knob 134, by being engaged with a non illustrated stopper, is prevented from intruding into the lifter knob 94 by more than a predetermined amount and maintained in the non-operation position. Other parts of the configuration of the vehicle seat 130 are the same as the corresponding parts of the configuration of the vehicle seat 90.

Therefore, also in the vehicle seat 130 according to the tenth exemplary embodiment, except for the release of the reclining locking by pulling out the reclining knob 134, similar operational effects may be obtained to those by operation of the vehicle seat 90 according to the sixth exemplary embodiment. Also, since the reclining knob 134 is connected to the lock release arm 20F through the linkage 96, with the reclining knob 134 configured to be pulled out from the lifter knob 94, a configuration is realized in which the reclining knob 134 is disposed with good operability on the opposite side of the rotational axis of the lifter knob 94 to that of the reclining mechanism 20.

Also here, since the direction of operation of the reclining knob 134 is different from the operation direction of the lifter knob 94, the operation force of the reclining knob 134 may be prevented from being transmitted to the seat lifter 22, and the operation force of the lifter knob 94 may be prevented from being transmitted to the reclining mechanism 20. That is to say, operation of an unintended adjuster by a vehicle occupant sitting in the seat may be prevented, and a good operation feel may be imparted to the seat occupant.

Furthermore, since the reclining knob 134 is configured to be pulled out, there is no need to provide the link guides 98, 104 in order for the linkage 96 to transmit the operation force that is mainly a tensile load.

Eleventh Exemplary Embodiment

Figure 20:
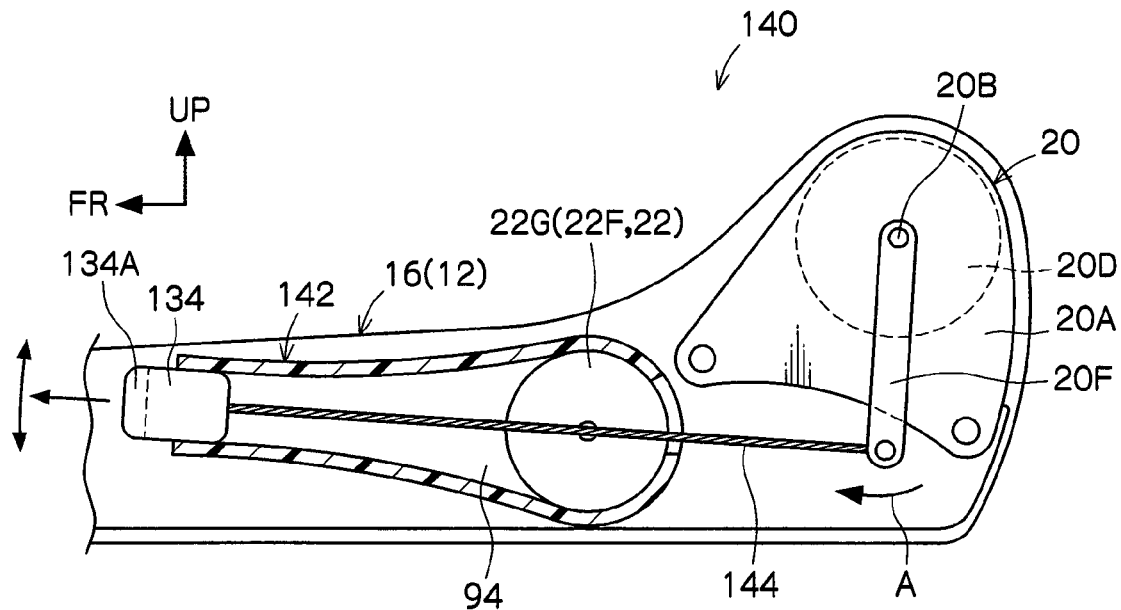
FIG. 20 is a side view of an operation force imparting unit of a vehicle seat according to an eleventh exemplary embodiment of the present invention.

In FIG. 20 is shown a side view of an operation force imparting unit 142 configuring a vehicle seat 140 according to an eleventh exemplary embodiment. This configuration is different from that of the tenth exemplary embodiment in that, as shown in the figure, the operation force imparting unit 142 is provided with a cable 144 that connects the reclining knob 134 and the lock release arm 20F, in place of the linkage 96 for connecting the reclining knob 134 and the lock release arm 20F.

The cable 144 is configured without a relatively displacing covering, and one end of the cable 144 is anchored to the lock release arm 20F and the other end thereof is anchored to the reclining knob 134. The cable 144, in the state in which the reclining knob 134 contacts a non illustrated stopper and is positioned in the non-operation position, is acted on by a tensile force arising from the biasing force of the torsion spring 20E. Also, in this state the cable 144 is disposed so as to pass through the rotational axis of the lifter knob 94 when viewed from the side. In the operation force imparting unit 142, when the lifter knob 94 is rotated to upper and lower operation positions, the straight line distance between the two ends of the cable 144 gets shorter, and the tensile force of the cable 144 slackens. Other parts of the configuration of the vehicle seat 140 are the same as corresponding parts of the configuration of the vehicle seat 130.

Therefore, also in the vehicle seat 140 according to the eleventh exemplary embodiment, similar operational effects may be obtained to those by operation of the vehicle seat 130 according to the tenth exemplary embodiment. Also, since the reclining knob 134 is connected to the lock release arm 20F through the cable 144, also with the reclining knob 134 configured to be pulled out from the lifter knob 94, a configuration is realized in which the reclining knob 134 is disposed with good operability on the opposite side of the rotational axis of the lifter knob 94 to that of the reclining mechanism 20.

Also here, since the direction of operation of the reclining knob 134 is different from the operation direction of the lifter knob 94, the operation force of the reclining knob 134 may be prevented from being transmitted to the seat lifter 22. Furthermore, since the tensile force of the cable 144 is slackened in the operational state of the lifter knob 94, the operation force of the lifter knob 94 may be prevented from being transmitted to the reclining mechanism 20 and the operation force of the reclining knob 134 during operation of the lifter knob 94 may be prevented from being transmitted to the reclining mechanism 20. In addition, since in the operation force imparting unit 142, the release of the reclining locking is carried out by tensile force of the cable 144, there is no need to provide the link guides 98, 104.

Twelfth Exemplary Embodiment

Figure 21:
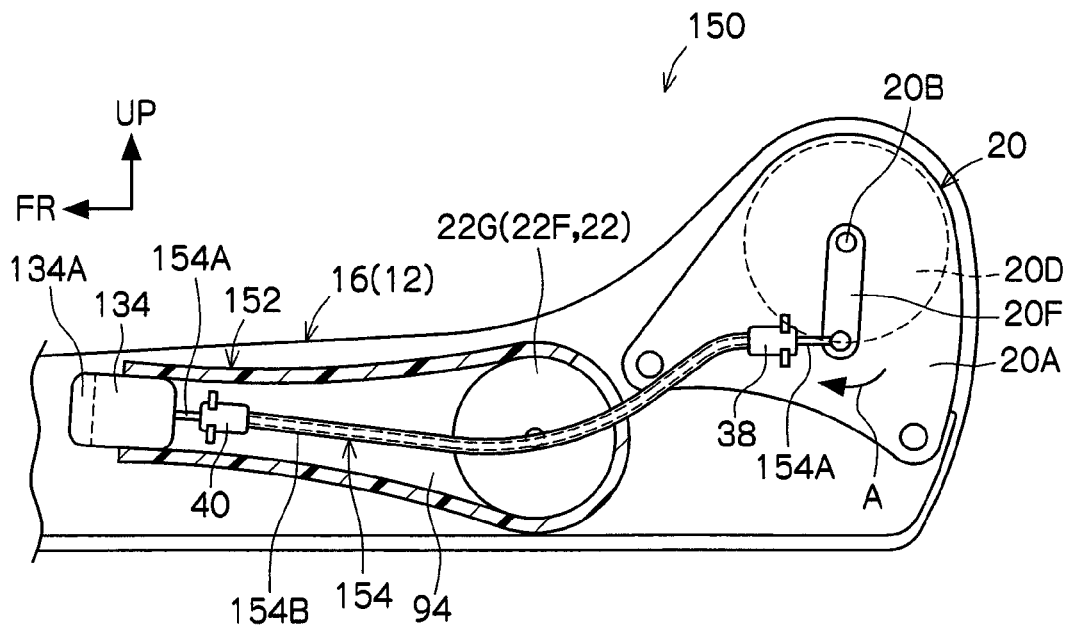
FIG. 21 is a side view of an operation force imparting unit of a vehicle seat according to a twelfth exemplary embodiment of the present invention.

In FIG. 21 is shown a side view of an operation force imparting unit 152 configuring a vehicle seat 150 according to a twelfth exemplary embodiment. This configuration is different from that of the eleventh exemplary embodiment in that, as shown in the figure, the operation force imparting unit 152 is provided with a covered cable 154 that connects the reclining knob 134 and the lock release arm 20F, in place of the cable 144 for connecting the reclining knob 134 and the lock release arm 20F.

The covered cable 154 is configured, in the same manner as the covered cable 36, with principal components of a cable 154A and a cover 154B that covers the cable 154A apart from portions at both ends in the length direction thereof. One end of the cable 154A is anchored to the lock release arm 20F and the other end is anchored to the reclining knob 134. One end of the cover 154B is fixed to a cable fixing bracket 38, and the other end thereof is fixed to a cable fixing bracket 40. The cable fixing bracket 38 is fixed to the seat cushion frame 16 (at the cushion side bracket 20A), and the cable fixing bracket 40 is fixed to the lifter knob 94. The covered cable 154 has slack when the reclining knob 134 is positioned in the non-operation position. The other parts of the configuration of the vehicle seat 150 are the same as corresponding parts of the configuration of the vehicle seat 140.

Therefore, also in the vehicle seat 150 according to the twelfth exemplary embodiment, similar operational effects may be obtained to those by operation of the vehicle seat 140 according to the eleventh exemplary embodiment. Also, since the reclining knob 134 is connected to the lock release arm 20F through the covered cable 154, with the reclining knob 134 configured to be pulled out from the lifter knob 94, a configuration is realized in which the reclining knob 134 is disposed with good operability on the opposite side of the rotational axis of the lifter knob 94 to that of the reclining mechanism 20.

Also here, since the direction of operation of the reclining knob 134 is different from the operation direction of the lifter knob 94, the operation force of the reclining knob 134 may be prevented from being transmitted to the seat lifter 22. Furthermore, since the covered cable 154 has slack in the operational state of the lifter knob 94, the operation force of the reclining knob 134 of the lifter knob 94 may be prevented from being transmitted to the reclining mechanism 20 and the operation force of the reclining knob 134 during operation of the lifter knob 94 may be prevented from being transmitted to the reclining mechanism 20. In addition, since in the operation force imparting unit 152 the release of the reclining locking is carried out by pulling displacement of the cable 154A relative to the cover 154B, there is no need to provide the link guides 98, 104.

In the operation force imparting unit 152, slack may be set in the covered cable 154 (it is not a configuration in which operation force is transmitted by tensile force), and therefore the cable fixing bracket 38 may be positioned in the position that is desired. Thereby, the lock release arm 20F may be shortened and the operation stroke also shortened, or the lock release arm 20F may be lengthened and the operation force reduced. That is to say, in the vehicle seat 150 the degrees of freedom for setting the operation force and operation stroke are increased.

It should be noted that in each of the above described exemplary embodiment, the present invention is applied to vehicle seats 10 to 150, however, the present invention is not limited thereto, and the present invention may be applied to various passenger seats and leisure chairs, as well as office chars.

Also, in each of the above described exemplary embodiment, examples where given in which the seat lifter 22 served as the first adjustable unit and the reclining mechanism 20 served as the second adjustable unit, however, the invention is not limited thereto, and, for example, operated lifter knob 32 and reclining lever 30 may be swapped, and the lifter knob (second operation member) may be configured so as to be contained in the reclining lever (first operation member). Or, for example, the reclining lever 30 and the lifter knob 32 may be configured to operate other objects (adjustable units). Examples that may be given of other adjustable units include a seat front portion tilt mechanism, for adjusting the height of the front portion of the seat cushion 12 relative to the back portion thereof, or a seat plane angle adjusting mechanism for adjusting the seat plane angle relative to the floor.

The invention claimed is:

1. A seat comprising:
a first adjustable unit for adjusting a position of the seat, provided to a seat body that is for sitting on, the first adjustable unit being adjusted by operation force transmitted from a first operating system;
a second adjustable unit for adjusting a position of the seat, provided to the seat body, the second adjustable unit being adjusted by operation force transmitted from a second operating system; and
an operation force imparting unit, the operation force imparting unit provided to the seat body in a predetermined position that is operable by a seat occupant, and the operation force imparting unit being able to operate independently in a first operation state in which operation force of the first operating system is input, and a second operation state in which operation force of the second operation system is input,
wherein the operation force imparting unit includes a first operating member for adjusting the first adjustable unit and a second operating member for adjusting the second adjustable unit,
wherein the first and second operating members selectively overlap, and
wherein in the first operation state, the first and second operating members are moved in a state of mutual overlap.

2. The seat according to claim 1, wherein
the first operating member is provided so as to be able to be positioned, by relative displacement with respect to the seat body, in a non-operation position and an operation position, the first operating member being for adjusting the first adjustable unit by operation force from moving from the non-operation position to the operation position;
wherein the second operating member is provided so as to be able to be positioned, by relative displacement with respect to the seat body, in a non-operation position and an operation position, the second operating member being for adjusting the second adjustable unit by operation force from moving from the non-operation position to the operation position; and
wherein an operation system support portion for supporting at least the first operating member such that the first operating member and the second operating member, when the first operating member and the second operating member are both in the non-operation position, overlap each other in their disposed spaces.

3. The seat according to claim 2, wherein the second operating member in the non-operation position is contained, in side view and in plan view, in the first operating member positioned in the non-operation position.

4. The seat according to claim 2, wherein the second operating member is supported by the first operating member so as to be able to relatively displace with respect to the seat body.

5. The seat according to claim 4, wherein:
one end of the first operating member is supported by the seat body so as to be able to rotate around a predetermined axis, and the other end of the first operating member is operated so as to rotate around the predetermined axis; and
the second operating member is supported by the first operating member such that the operation force when the second adjustable unit is being adjusted acts in a direction that is through the rotational axis of the first operating member.

6. The seat according to claim 2, wherein:
one end side in a seat front-rear direction of the first operating member is supported by the seat body so as to be able to rotate around an axis that is along a width direction of the seat, and a second end in the seat front-rear direction of the first operating member is operated in a seat up-down direction; and one end side in the seat front-rear direction of the second operating member is supported by one of the seat body and the first operating member, so as to be able to rotate around an axis that is along the width direction of the seat, and a second end in a seat front-rear direction of the second operating member is operated in the seat up-down direction.

7. The seat according to claim 6, wherein the second operating member:

is supported by the first operating member so as to be rotatable about a rotation axis that is parallel to the rotational axis of the first operating member, and is connected to the second adjustable unit through a cable so as to be adjustable; and a pulling direction of the cable, during operation for adjusting the second adjustable unit, passes through the rotational axis of the first operating member along the seat front-rear direction.

8. The seat according to claim 2, wherein:

one end side in the seat front-rear direction of the first operating member is supported by the seat body so as to be able to rotate around an axis that is along the width direction of the seat, and the other end in the seat front-rear direction of the first operating member is operated in the seat up-down direction; and one end side in the seat width direction of the second operating member is supported by the seat body, or by the first operating member, so as to be able to rotate around an axis that is along the front-rear direction of the seat, and the other end in the seat width direction of the second operating member is operated in the seat up-down direction.

9. The seat according to claim 2, wherein:

one end side in the seat front-rear direction of the first operating member is supported by the seat body so as to be able to rotate around an axis that is along the width direction of the seat, and the other end in the seat front-rear direction of the first operating member is operated in the seat up-down direction; and one end side in the seat front-rear direction of the second operating member is supported by the seat body, or by the first operating member, so as to be able to rotate around an axis that is along the up-down direction of the seat, and the other end in the seat front-rear direction of the second operating member is operated in the seat width direction.

10. The seat according to claim 2, wherein:

the second operating member is supported by the first operating member so as to be able to relatively displace with respect to the seat body, and is connected to the second adjustable unit, through a cable of a covered cable that has a covered portion thereof fixed to the first operating member, so that the second adjustable unit is adjustable; and the covered cable has a length such that tension is not generated in the covered portion accompanying the movement of the first operating member to the operation position.

11. The seat according to claim 2, wherein:

one end side in the seat front-rear direction of the first operating member is supported by the seat body so as to be able to rotate around an axis that is along the width direction of the seat, and the other end in the seat front-rear direction of the first operating member is operated in the seat up-down direction; and the second operating member is supported by the first operating member so as to be able to move in the front-rear direction of the seat, and is operated in the seat front-rear direction.

12. The seat according to claim 11, wherein a portion of the second operating member in the non-operation position projects out from an end portion in the seat front-rear direction of the first operating member, and is operated by pushing in toward the inside of the first operating member.

13. The seat according to claim 11, wherein:

the second operating member is positioned in the seat front-rear direction to the opposite side of the first operating member rotational axis than the side of the second adjustable unit, and is connected by a linkage for transmitting operation force to the second adjustable unit; and the linkage comprises a link axis that is positioned coaxially to the rotational axis of the first operating member when the second operating member is in the state of being positioned in the non-operation position.

14. The seat according to claim 13, wherein:

the second adjustable unit comprises an arm member that converts operation force along the seat front-rear direction transmitted from the linkage to a moment about a predetermined axis along the seat width direction; and the linkage comprises a position for load input from the second operating member and a position for load output to the arm member that are different from each other in height in the seat up-down direction.

15. The seat according to claim 13, further comprising a link guide provided to the first operating member or to the seat body, the link guide restricting angular displacement of the linkage about the link axis accompanying movement of the second operating member from the non-operation position to the operation position.

16. The seat according to claim 15, wherein the link guide is integrally formed to the first operating member.

17. The seat according to claim 15, wherein the first operating member and the second operating member are disposed at the seat body at an edge portion thereof in the seat width direction; and the link guide is formed integrally to a cover member that configures the seat body and covers the linkage from the outside in the seat width direction.

18. The seat according to claim 11, wherein a portion of the second operating member in the non-operation position projects out from an end portion in the seat front-rear direction of the first operating member, and is operated by pulling in a direction that is out from the first operating member.

19. The seat according to claim 18, wherein:

the second operating member is positioned in the seat front-rear direction to the opposite side of the first operating member rotational axis than the side of the second adjustable unit, and is connected by a linkage for transmitting operation force to the second adjustable unit; and the linkage comprises a link axis that is positioned coaxially to the rotational axis of the first operating member when the second operating member is in the state of being positioned in the non-operation position.

20. The seat according to claim 2, wherein the second operating member and the first operating member are positioned on opposite side of a first operating member rotational axis in a seat front-rear direction, and wherein the second operating member is connected by a cable such that operation force is able to be transmitted to the second adjustable unit.

21. The seat according to claim 1, wherein the first adjustable unit is a height adjustment mechanism for adjusting the position of the seat body in an up-down direction.

22. The seat according to claim 1, wherein the second adjustable unit is a reclining mechanism for switching between a locked state of an angle of a seat back with respect to a seat cushion, and a lock released state thereof.

23. The seat according to claim 1, wherein:
the first operating member is supported by the seat body so as to be able to rotate around a first axis;
the second operating member is supported by the seat body so as to be able to rotate around a second axis; and
the first axis and the second axis are separated from each other.

* * * * *